US012690597B2

(12) United States Patent
Garcia Moreno et al.

(10) Patent No.: US 12,690,597 B2
(45) Date of Patent: Jul. 28, 2026

(54) BIOPESTICIDE COMPOSITIONS COMPRISING PLANT EXTRACTS AND PHYTOSANITARY USE THEREOF

(71) Applicant: KIMITEC BIOGROUP, S.L., Vicar (ES)

(72) Inventors: Félix Garcia Moreno, Vicar (ES); Efrén Remesal González, Vicar (ES); Luis Fernando Julio Torres, Vicar (ES); Omar Santana Méridas, Vicar (ES); María Martín Bejerano, Vicar (ES); Salvador Giménez García, Vicar (ES)

(73) Assignee: KIMITEC BIOGROUP, S.L., Vicar (ES)

( * ) Notice: Subject to any disclaimer, the term of this patent is extended or adjusted under 35 U.S.C. 154(b) by 824 days.

(21) Appl. No.: 17/864,268

(22) Filed: Jul. 13, 2022

(65) Prior Publication Data

US 2022/0354128 A1 Nov. 10, 2022

Related U.S. Application Data

(63) Continuation of application No. PCT/ES2020/070037, filed on Jan. 20, 2020.

(51) Int. Cl.
*A01N 65/48* (2009.01)
*A01N 25/26* (2006.01)

(52) U.S. Cl.
CPC .............. *A01N 65/48* (2013.01); *A01N 25/26* (2013.01)

(58) Field of Classification Search
None
See application file for complete search history.

(56) References Cited

U.S. PATENT DOCUMENTS

| | | |
|---|---|---|
| 8,202,557 B1 | 6/2012 | Doty |
| 2013/0331462 A1 | 12/2013 | Jimenez et al. |

FOREIGN PATENT DOCUMENTS

| | | |
|---|---|---|
| CN | 104996500 A | 10/2015 |
| CN | 106472611 A | 3/2017 |
| CN | 108835137 A | 11/2018 |
| ES | 2444991 A1 | 2/2014 |
| WO | 03/033008 A1 | 4/2003 |
| WO | 2016/170531 A1 | 10/2016 |

OTHER PUBLICATIONS

Flanery et al., "Laboratory Evaluation of Biorational and Low Risk Insecticides and Their Mixtures for Management of Diamondback Moth Larvae", Journal of Agricultural Science and Technology, 2016, A 6, pp. 77-91.
Isman et al., "Commercialization of Insecticides Based on Plant Essential Oils: Past, Present, and Future", Green Pesticides Handbook, 2017, Chapter 2: 27-39.
Ciriminna et al., "Orange Oil", Green Pesticides Handbook, 2017, Chapter 15: 291-301.
International Search Report for PCT/ES2020/070037 (Oct. 5, 2020).

*Primary Examiner* — Michael V Meller
(74) *Attorney, Agent, or Firm* — Hayes Soloway P.C.

(57) ABSTRACT

A biopesticide composition contains a synergistic bioactive core consisting of essential oil, oleoresin, aqueous, alcoholic or hydroalcoholic extract of root or rhizomes of *Zingiber officinale* Roscoe and cinnamaldehyde or source of cinnamaldehyde. The composition may contain at least one secondary component and/or inert substances. A method is used for obtaining the biopesticide composition. The biopesticide composition is used in agriculture, parks and sports facilities against pests belonging to the whitefly group.

12 Claims, 9 Drawing Sheets

FIGURE 9A
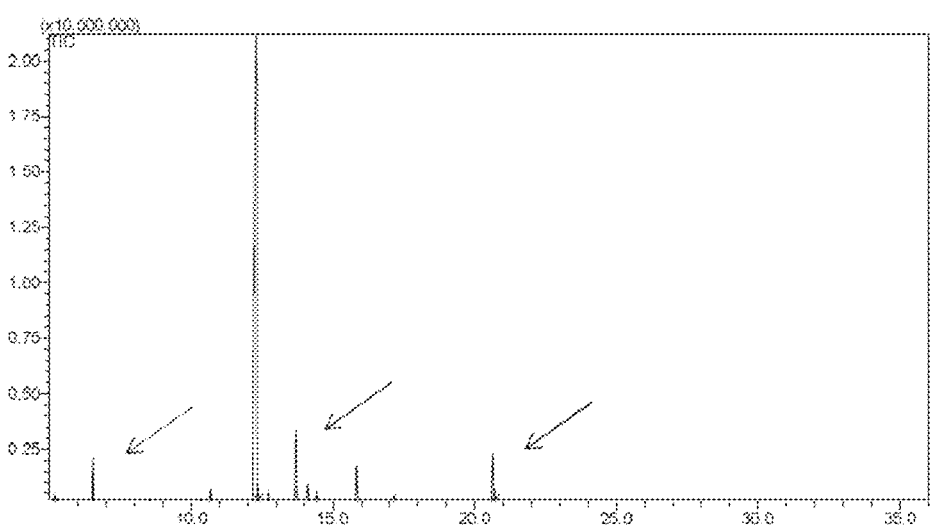
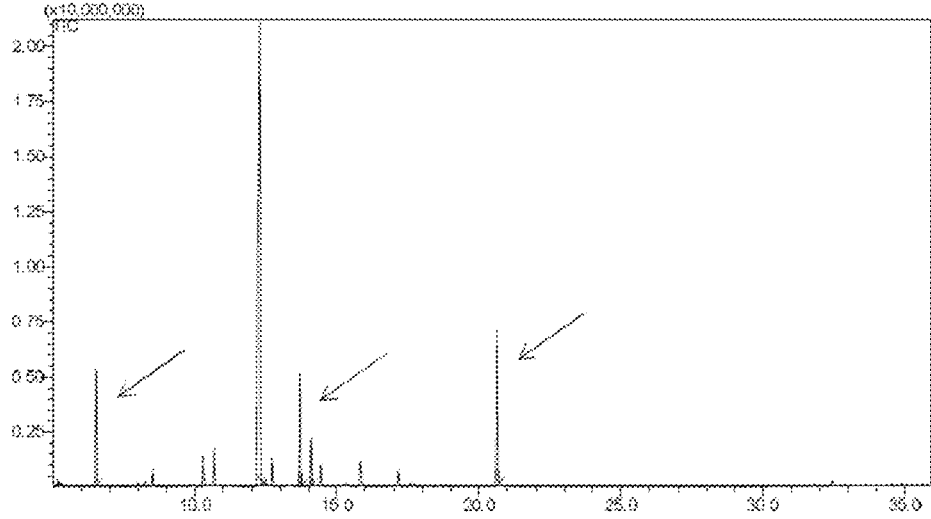
FIGURE 9B

Allocation of treatment

Sampling units

FIGURE 11

BIOPESTICIDE COMPOSITIONS COMPRISING PLANT EXTRACTS AND PHYTOSANITARY USE THEREOF

This application is a Continuation of PCT International Application No. PCT/ES2020/070037, filed Jan. 20, 2020, and which application is incorporated herein by reference. To the extent appropriate, a claim of priority is made to the above-disclosed application.

TECHNICAL FIELD

The invention belongs to the field of agriculture and plant biotechnology, and more particularly in the field of biopesticides derived from plant materials, and particularly in the field of biochemical biopesticides comprising natural substances such as extracts and fatty acids that control pests and diseases.

BACKGROUND ART

The mass use of chemical plant protectants in the agricultural sector, primarily for pro and post-harvest protection, constitutes one of the main sources of toxic residues in the food chain. The increase in the world population is directly linked to an increase in agricultural production regard to the demand for food.

Currently, the use of phytosanitary products and synthetic fertilizers constitute the main tools available for crop protection and their correct nutrition and development process. However, excessive use of these chemical products has led to the development of pest resistance, environmental pollution, toxicity in other organisms, and risks to human health.

Chemical multinational companies (conventional agriculture) cope with a pest, disease or nutritional problem by applying products based on chemical synthesis of individual molecules of high persistence and with a single specific mechanism of action. This causes the rapid emergence of cross-resistance (pests and diseases) or loss of efficacy (fertilizers) of the product, as well as negative impact on the environment and human health.

Serious problems arising from the intensive use of chemical pesticides have resulted in the stricter legislation on the use of these types of compounds (ex. 2009/128/EC Directive). It is therefore that, due to the legislative requirements of feed safety that it increasingly restrictive imposed by current laws associated with market and consumer demands, an increasing need has provoked in developing new bioproducts address to crop protection.

In this regard, the development of natural crop protection products (biopesticides) offers a real alternative with high multifunctionality related to a wide and complex chemical composition. Delaying or preventing the emergence of cross-resistance in pests and diseases; the main problem, technically demonstrated, associated with the continued use of synthetic products.

Until now, the vast majority of biopesticides developed and commercialized have significant limitations related to the lack of availability of raw materials from renewable sources, at the same time it shall be abundant, cheap, homogenous, traceable and rich in healthy and effective active ingredients.

The secondary metabolites of microorganisms (fungi, bacteria, yeasts), extracts of plant origin (plants, algae, agroindustrial by-products) and chemical compounds derived therefrom are certainly the most studied and abundant sources of raw materials for the development of biopesticides.

Plants are a natural factory of chemical substances with biopesticidal activity, derived primarily from secondary metabolism and as a consequence of millions of years of co-evolution between plants and pests. These substances are characterized by belonging to various chemical classes resulting in a large multifunctionality. These include terpenes, sterols, alkaloids, polyphenols (flavones, isoflavones, coumarins, lignans, iridoids, phenylpropanoids), glucosinolates, isothiocyanates, fatty acids, esters, and essential oils.

Essential Oils (AEs) obtained mostly from aromatic, medicinal and/or seasoning plants through different distillation and/or solvent extraction processes with low polarity including $CO_2$ (supercritical extraction) deserve a special mention. AEs represent the most volatile part of numerous plant species mainly belonging to the Lamiaceae family and comprise complex mixtures of monoterpenes, sesquiterpenes and aromatics. Undoubtedly, these compounds are the most widely used natural components in the development of biopesticides. Papers that refer to the application of AEs as biopesticides "potential" for pest and disease control occupy over 70% of the total scientific publications on plant-derived plant protection compounds. However, 95% of these publications are only assays of labs and very few refer to actual scale-up process. (Green Pesticides Handbook. Essential Oils for Pest Control. ISBN: 13-978-1-4987-5938-0,2017).

The present invention overcomes the limitations existing in the state of the art. It consists of the development of new biopesticidal compositions that may be used in the plant treatment of fly pests, mainly of the complex of whiteflies (Hemiptera: Aleyrodidae). At the same time, biopesticidal compositions of the invention are easily obtainable, scalable and effective, respect to the efficacy of chemical synthesis products and/or natural products currently used in conventional agricultural and organic systems. They also present the advantage of attenuating the development of cross-resistance, exhibiting no phytotoxicity and being environmentally friendly.

Conventional insecticides contain one or two active molecules obtained by chemical synthesis and generally belong to the same or closely related chemical group. Such molecules very specifically affect a target site on a common receptor is the primary cause of the emergence of cross-resistance with consequent loss of efficacy (IRAC, 2019; https://bit.ly/33t9FF8). Likewise, most of the natural solutions on the market derived from plant extracts where mostly those containing between 3-5 active molecules predominate, with the consequent risk of resistance development.

In the case of biopesticides, the complexity of their chemical composition (several molecules belonging to different chemical groups) allows them to exert their action through different mechanisms of action, thus minimizing the emergences of resistances and increasing their long-term effectiveness.

The compositions claimed in this invention exhibit a complex chemical composition. They have in common a synergistic bioactive core composed of active molecules belonging to very divergent chemical classes. Such complexity is directly associated with the formulated multifunctionality in terms of overall modes of action and efficacy. Chemically different molecules can influence the same mode of action (e.g., repellency) acting on different sites of action. In these cases, the risk of development of cross-resistance is extremely low.

The Insecticide Resistance Action Committee (IRAC, 2019; https://bit.ly/33t9 FF8) recommends "the alternations, sequences, or rotations of compounds with different mechanisms of action (MoA) for the sustainable and effective management of the occurrence of cross-resistance." In the case of chemical insecticides and those biopesticides of very simple chemical composition (predominately of a certain molecule), it would involve alternating different products (different synthesis chemicals and/or synthesis products with biopesticides) with different mechanisms of action. In the case of the compositions of the present invention, this would not be necessary because of alternation of mechanisms of action would be ensured by a wide variety of different molecules making up of the formula. Neither there is in the prior art nor market for biopesticides a composition as disclosed herein, wherein the final formulation on a commercial scale exhibits a synergistic, cooperative and/or potentiating effect allowing:

Reduce the dosage of the active ingredients and hence the loading of the formulate to be used.

Act by more than one mechanism of action combining physical effects (mortality from contact and flipping) and effects on chemoreceptors that control the feeding Requiem® (Bayer): It contains approximately 25% of *Chenopodium ambrosioides* extract components, specifically a blend of α-terpinene, p-cymene and limonene.

Pre-VAM® (Gold Agri SA. Ltd.): Contains between 6-10% of orange oil with upper of 90% of limonene.

Pyrecris® (SEIPASA): Contains 2% natural pyrethrin.

Agroneem™ (Ajay Bio Tech India Limited Body Incorporate). It contains azadirachtin, a major component of Neem oil (Azadirachta indica).

These formulations have been shown to be effective in controlling different whitefly pests. However, the compositions disclosed herein exhibit clear advantages over such formulations in respect of:

Chemical Identity.

Type and alternating mechanisms of action (MoAs).

Cross Resistance Management (CRM).

Efficacy.

A comparison of the advantages of the disclosed compositions versus formulations of similar nature is shown in Table 1.

TABLE 1

Comparative advantages of the compositions of the present invention

| Characters | Requiem ® | Pre-VAM ® | Pyrecris ® | Agroneem ™ | Disclosed compositions |
|---|---|---|---|---|---|
| Chemical Identity (acitve elements) | Terpinene + p-cymene + limonene (~25%) | Limonene (>95%) | Natural pyrethrin (2%) | Azadirachtin (~1%), Neem(variable) | >20 different active molecules of chemical classes in bioactive core and the rest of composition's active ingredients |
| Types MoAs(no) | 2 | 1 | 2 | 2 | 3 |
| Emergence of resistances | Low probability | Probable | Probable | Probable | Very low probability |
| Efficacy (by-contact) | Medium | High | Medium | Unknown | High |
| Efficacy (antifeeding) | High | Medium | Unknown | High | High |
| Efficacy (nervous system, toxic and/or post. ingestive) | Unknown | Unknown | High | High | NO |
| References | 1, 2 | 2, 3 | 4 | 5 | Present invention |

References:
1 US 2013/0331462 A1
2 Green Pesticides Handbook. Essential oil for pest control. Chapter 2. Commercialization of insects based on essential oil. Nollet & Singh, Eds. CRC Press, ISBN 978-1-4987-5938-0.
3 Green Pesticides Handbook Essential oil for pest control. Chapter 15. Orange oil. Nollet & Singh, Eds. CRC Press, ISBN: 13-978-1-4987-5938-0.
4 ES2444991 A1.
5 Journal of Agricultural Science and Technology A 6 (2016) 77-91.

and physiological behavior of whitefly (antifeedants, repellents and inhibitors of oviposition).

Controlled release of active ingredients

Eliminate or minimize the appearance of cross-resistance to whitefly group pests due to their nature and multifunctionality.

Label the product as "zero residue" according to current legislation. The formulations contain secondary metabolites of plants that normally exist in nature and exhibit a rapid rate of degradation.

Delete security timeframes.

Label the product as safe. People and beneficial organisms ("non-target") have been naturally exposed to the secondary metabolites that make up of the disclosed formulations.

Relevant examples of commercial formulations falling into the classification of natural insecticides are:

However, there are differences and distinctions between biopesticides that determine their success against synthesis products and their prevalence in the marketplace. Pre-VAM® (Gold Agri SA. Ltd.) is a natural formulation consisting of orange oil and approved for use as plant protection in USA, Canada, Europe and other countries. Despite its efficacy, there are several disadvantages compared to the compositions claimed in this invention. The majority presence in its single ingredient composition (more than 95% d-limonene) with a proposed mechanism of action increases the risk of resistance arising. In addition, the high volatility and instability of orange oil make it difficult to apply in open field conditions (Green Pesticides Handbook. Essential oil for pest control. Chapter 15. Orange oil. Nollet & Singh, Eds. CRC Press, ISBN 978-1-4987-5938-0). On the other hand, formulated as Pirecris® and Agroneem™, as well as a simple chemical composition, act by toxic mechanisms of action at the nervous system (Pirecris®) or digestive enzymes (Agroneem™). This increases the likelihood of effects on beneficial ("non-target") organisms while the risk of resistance emergence is higher.

DISCLOSURE OF INVENTION

The following terms of the invention are more fully defined below.

"Biopesticidal compositions or plant protection compositions" are terms used interchangeably herein. They can be defined as any biological entity, living or naturally occurring, including by-products and/or chemical substances derived from them; controlling/regulating everything we call plant pest and/or disease.

"Crude extract, plant extract, or botanical extract" are terms used interchangeably herein.

Any of the alternatives mentioned in claim 1: "essential oils, oleoresins, aqueous, alcoholic or hydroalcoholic extracts" are products obtained from the root or rhizomes of *Zingiber officinale* Roscoe. These products may be crude products as obtained from their extraction process or may be fractions thereof which may be obtained by guided fractionation by chromatographic methods, liquid-liquid separation, evaporation, crystallization or distillation. Furthermore, these products may be pure substances or mixtures of substances.

"Source of cinnamaldehyde" herein includes any mixture of compounds including cinnamaldehyde or from which cinnamaldehyde may be obtained.

Herein "bioactive core" is equivalent to "first component."

Herein, "active elements" is equivalent to "active ingredients".

Herein, "encapsulating agent" is equivalent to "encapsulating matrix".

"End-application-solution" refers to the diluted biopesticide composition ready for application.

"Additional substances and co-formulants" are terms used interchangeably herein. They refer to inert substances that can form part of the pesticidal composition and whose purpose is to increase their effectiveness. Examples of such substances are adjuvants, dispersing agents, penetrating agents, emulsifiers, stabilizers, flavors, defoamers and/or preservatives.

"Pure compounds" refers to any natural compound that acts as a second active component in the biopesticidal composition and can be obtained by a synthetic process, as part of a semi-purified fraction or isolated in the pure state from natural sources containing it.

Any other term used herein shall have the usual meaning of the state of art to which the present invention relates.

The technical problem which solves the present invention is the development of biopesticidal compositions used in the plant protection treatment of pests included in the group of whiteflies. The compositions comprise a bioactive core (consisting of an essential oil, oleoresin, aqueous, alcoholic, or hydroalcoholic root extract or rhizomes of *Zingiber officinale* and cinnamaldehyde, a cinnamaldehyde source and soy lecithin). Further, it has been found that components of the bioactive core surprisingly exhibit a potentiating effect, when it is combined with others phytosanitary products or pest and disease control systems.

Thus, the present invention discloses a biopesticide composition comprising a synergistic bioactive core comprising:

Essential oil, oleoresin, aqueous, alcoholic or hydroalcoholic root extract or rhizomes of *Zingiber officinale* Roscoe and cinnamaldehyde or a cinnamaldehyde source.

soy lecithin present in solid, liquid form or fluid or hydrolyzed or partially hydrolyzed.

The concentration, % w/w of each component in the bioactive core, is in the following ranges:

Essential oil, oleoresin, aqueous, alcoholic or hydroalcoholic root extract or rhizomes of *Zingiber officinale* Roscoe: 0.1-99.9% (w/w), preferably 10-90% (w/w), more preferably 20-80% (w/w), even more preferably 30-70% (w/w) and most preferably 40-60% (w/w) and cinnamaldehyde or a source of cinnamaldehyde: 0.1-99.9% (w/w), preferably 10-90% (w/w), more preferably 20-80% (w/w), even most preferably 30-70% (w/w) and most preferably 40-60% (w/w).

soy lecithin present in solid, liquid or fluid or hydrolyzed or partially hydrolyzed form: 0.1-99.8%, preferably 30-80%, and more preferably 30-50%

The cinnamaldehyde may be trans, cis or the mixture of isomers.

Cinnamaldehyde as a component of the bioactive core is obtained as:

Compound with high purity 95%) isolated/purified from species of the genus *Cinnamomun* sp. containing it, Compound with high purity 95%) obtained by total synthesis, semi-synthesis or biomimetic synthesis and Compound produced by any organism (example. filamentous fungi like *Aspergillus* sp., bacteria and insects) in biotransformation and/or bioconversion processes.

The cinnamaldehyde source as a component of bioactive core may be essential extracts/oils from plant species containing the core, preferably from the genus *Cinnamomum* sp. Significant examples of cinnamaldehyde containing species of these genera are; *C. verum.* (synonymy *Cinnamomum zeylanicum*), *C. cassia, C. loureirii, C. burmannii, C. tamale, C. osmophloeum, C. bejolghota, C. dubium, C. rivulorum, C. citriodorum*, and *C. camphora*.

The cinnamaldehyde and/or the cinnamaldehyde source may be used in free form and/or encapsulated in an encapsulating agent.

The encapsulating agent may be selected from maltodextrins, cyclodextrins, lecithin, vegetable oils and/or silica excipients, the latter comprising silica gel (silica gel), colloidal silica and silicon dioxides, preferably cyclodextrins are used.

The encapsulated form of the cinnamaldehyde source increases its biological activity and promote controlled release of the active ingredient or element.

In a particular embodiment of the invention the biopesticidal compositions further comprise a second component. This second component may be one or more active elements or ingredients. The active ingredient as a second component may be selected from one or more of:

botanical extracts or fractions of extracts, extract obtained from fermentation of microorganisms or fractions of said extracts, Pure compounds selected from geranial (citral A), neral (citral B), saponins, benzyl alcohol, benzyl benzoate, benzyl acetate, eugenol, 1,8-cineole, thymol, geraniol, geranyl acetate and fatty acids, selected from short and long chain saturates, preferably long chain and unsaturated, and derivatives of fatty acids (e.g., methylated, methyl esters of fatty acids, FAME, "fatty acid methyl ester") more preferably long chain saturated fatty acids and/or unsaturated fatty acids and, The botanical extract may be selected from:

aqueous, alcoholic and hydroalcoholic extracts and/or essential oils.

The origin of the botanical extract may be selected from agro-industrial waste, bulbs, seeds, leaves, follicles, flowers and/or whole aerial part from plants belonging to the following genera: *Angelica* sp. *Annona* sp., *Artemisia* sp., *Carum* sp., *Cassia* sp., *Chenopodium* sp., *Citrus* sp., *Coffea* sp., *Crocus* sp., *Cyamopsis* sp., *Cymbopogon* sp., *Cytisus* sp., *Eurycoma* sp., *Ficus* sp, *Fumaria* sp. *Geranium* sp., *Ginkgo* sp., *Helianthus* sp., *Hyssopus* sp., *Jatropha* sp., *Lavandula* sp., *Mentha* sp., *Moringa* sp., *Nigella* sp., *Ocimum* sp., *Olea* sp., *Papaver* sp., *Pelargononium* sp., *Persea* sp., *Petroselinum* sp., *Pimpinella* sp., *Prunus* sp. *Quassia* sp., *Retama* sp., *Rheum* sp., *Rosmarinus* sp., *Salvia* sp., *Satureja* sp., *Schoenocaulon* sp., *Trigonella* sp., *Thymus* sp. and *Vitis* sp., preferably the species: *Angelica archangelica*, *Annona cherimola*, *Artemisia absinthium*, *Carum carvi*, *Cassia angustifolia*, *Cassia senna*, *Chenopodium ambrosioides*, *Citrus aurantium*, *Citrus lemon*, *Citrus sinensis*, *Coffea arabica*, *Crocus corsicus*, *Crocus sativus*, *Crocus speciosus*, *Crocus vernus*, *Cymbopogon citratus*, *Cyamopsis tetragonoloba*, *Cymbopogon flexuosus*, *Cymbopogon martinii*, *Cymbopogon nardus*, *Cytisus scoparius*, *Eurycoma longifolia*, *Ficus carica*, *Fumaria officinalis*, *Geranium macrorrhizum*, *Ginkgo biloba*, *Helianthus annuus*, *Helianthus tuberosum*, *Hyssopus officinalis*, *Jatropha curcas*, *Lavandula angustifolia*, *Lavanda* x Intermediate, *Lavandula luisieri*, *Mentha* piperita, *Mentha spicata*, *Moringa oleifera*, *Nigella sativa*, *Ocimum basilicum*, *Olea europaea*, *Papaver rhoeas*, *Papaver somniferum*, *Pelargonium citriodorum*, *Pelargonium graveolens*, *Persea americana*, *Persea indica*, *Petroselinum sativum* (syn. *P. crispum*), *Pinpinella anisum*, *Prunus persica*, *Quassia amara*, *Retama* monosperma, *Retama sphaerocarpa*, *Rheum* rhabarbarum, *Rheum officinale*, *Rosmarinus officinalis*, *Salvia lavandulifolia*, *Salvia officinalis*, *Satureja montana*, *Schoenocaulon officinale*, *Trigonella foenum-graecum*, *Thymus* vulgaris, *Thymus zygis*, and *Vitis vinifera*.

Fermentation products refer to the extract or fermentation liquid (neat or previously extracted with an organic solvent) resulting from the fermentation process of a microorganism (fungus or bacteria) in the presence of a plant substrate and upon removal of live microganism by a pasteurization process.

The extract obtained from microorganism fermentation may be selected from extracts obtained from fermentation of a substrate with *Bacillus* sp., *Pseudomonas* sp., *Trichoderma* sp. *Corynebacterium* sp. and *Aspergillus* sp, preferably: *Aspergillus niger*, *Trichoderma harzianum*, *Bacillus thuringiensis*, *Pseudomonas fluorescens*, *Bacillus amyloliquefaciens*, *Corynebacterium efficiens* and *Bacillus subtilis*.

The fermentation substrate may be chosen among agro-industrical residues, bulbs, seeds, leaves, follicles, flowers and/or whole aerial parts from plants belonging to the following genera: *Zingiber* sp., *Citrus* sp., *Cyamopsis* sp., *Crocus* sp., *Helianthus* sp., *Petroselinum* sp., *Papaver* sp., *Rheum* sp., *Salvia* sp., *Retama* sp., *Lavandula* sp., *Prunus* sp., *Persea* sp., *Turmeric* sp., and *Thymus* sp., preferably: *Agaricus bisporus*, *Cyamopsis tetragonoloba*, *Helianthus annus*, *Citrus* x *sinensis* and *Glycine max*.

Pure compounds can be obtained from some of the following sources:

for citral, geranial and neral Isomers, species included in the genera *Cymbopogon* sp. [example: *C. citratus*, *C. martinii*, *C. flexuosus*, *C. winterianus*, *C. nardus*), among others], *Litsea* sp. (example: *L. cubeba*, *L.*

*citrate*, among others), *Aloysia* sp. (example: *A. citrodora*, among others), *Ocimun* sp. (example: *O. gratissimum*, among others), *Melissa* sp. (example: *M. officinalis*, among others) and *Citrus* sp. for eugenol those included in the genus *Cinnamomum* sp. [example: *C. verum* (syn., *Cinnamomum zeylanicum*), *C. cassia*, *C. citriodorum*, *C. camphora*, among others], *Syzygium* sp. (example: *S. aromaticum*, among others), *Curcuma* sp. (example: *C. longa*, among others), *Zingiber* sp. (example: *Z. officinale*, among others), and *Ocimum* sp. (ex. *O. tenuiflorum*, among others), for saponins, species included in the genera *Cyamopsis* sp. (example: *C. tetragonoloba*, among others), *Quillaja* sp. (example: *Q. saponaria*, among others), *Trigonella* sp. (example: *T. foenum-graceum*, among others), *Saponaria* sp. (*S. officinalis*, among others), *Crocus* sp. (example: *C. sativus*, among others), *Yucca* sp. (example: *Y. schidigera*, among others), Beta sp. (example: *B. Vulgaris*, among others), *Hedera* sp. (example: *H. helix*, among others), *Polygala* sp. and *Primula* sp. For benzyl alcohol included in the genera *Cinnamomum* sp. (example: *C. cassia*) and *Jasminum* sp. (example: *J. grandiflorum*, among others), for 1,8 cineol (Eucalyptol), the species included in the genera *Eucalyptus* sp. (example: *E. globulus*, *E. camaldulensis*, among others), *Salvia* sp. (example. *S. officinalis*, *S. fructicosa*, among others), *Thymus* sp. (example: *T. vulgaris*, *T. zigys*, *T. capitatus*, among others), *Curcuma* sp. (example: *C. Loriga*, among others), *Rosmarinus* sp. (example: *R. officinalis*, among others), *Artemisia* sp. (example: *A. vulgaris*, among others), for geraniol those included in the genera *Rosa* sp. (example: *R. damascena*, *R. alba*, *R. gallica*, among others), *Cymbopogon* sp. (example: *C. citratus*, *C. martini*, *C. flexuosus*, *C. winterianus*, *C. nardus*, among others), *Geranium* sp. (*G. pretense*, *G. macrorrhizum*, among others), *Pelargonium* sp. (example; *P. hirsutum*, among others), for fatty acids are species encompassed by the genera *Persea* sp. (example: *P. americana*, among others), *Glycine* sp. (example: *G. max*, among others), *Helianthus* sp. (example: *H. annuus*, among others), *Olea* sp. (example: *Olea europaea*) and other oilseeds, total synthesis, semi-synthesis or biomimetic synthesis of the pure compound and/or analogues via structure-activity relationship (SAR) and Produced by any organism selected from filamentous fungi such as *Aspergillus* sp., bacteria and insects in biotransformation and/or bioconversion processes.

The second component may be used in free or encapsulated form.

The concentration of the second component in the biopesticidal composition is combined with the bioactive core, in the following total weight/volume composition concentration range: 1-30% (w/v), preferably 5-25% (w/v) and even more preferably 10-20% (w/v).

Biopesticidal compositions may further comprise at least one inert substance which may be selected from among: adjuvants, emulsifiers, dispersants, flavors, preservatives, defoamers, thixotropic agents, matrices of encapsulation, fatty acids, phospholipids and mixtures thereof.

Adjuvants may be organosilicones from the group of organosiloxanes.

Thixotropic agents can be carboxymethylcellulose, carboxymethylcellulose sodium, microcrystalline cellulose and other cellulose derivatives preferably gum and gel.

Matrices of encapsulation may be selected among malto-dextrins, cyclodextrins, lecithins, vegetable oils and/or silica excipients, the latter comprising silica gel, colloidal silica and silicon dioxides, preferably cyclodextrins.

In a particular embodiment of the invention the biopesticidal composition comprises bioactive core, optionally other substances referred to as second components and/or inert substances.

In a particular embodiment of the invention, biopesticide composition is selected from biopesticidal compositions comprising:

Zingiber officinale, Cinnamomum verum and soy lecithin,

Zingiber officinale, Cinnamomum verum, Satureja montana hydroalcoholic extract, and soy lecithin, Zingiber officinale, Cinnamomum verum, soy lecithin, silicone derivative organosiloxane type, β-cyclodextrin and polymeric adjuvant, Zingiber officinale, Cinnamomum cassia, Persea americana, Cymbopogon citratus, soy lecithin, Tween-80, Silicone derivative organosiloxane type, Carboximentylcellulose, β-cyclodextrin and polymeric adjuvant, Zingiber officinale, Cinnamomum verum, Persea americana, Aspergillus sp., soy lecithin, silicone derivate organosiloxanes type and polymeric adjuvant, Zingiber officinale, Cinnamomum cassia, Mentha piperita, soy lecithin, silicone derivate organosiloxane type and polymeric adjuvant, Zingiber officinale, Cinnamomum cassia, Cassia angustifolia, soy lecithin, silicone derivate organosiloxane type and polymeric adjuvant.

Zingiber officinale, Cinnamomum cassia, Trigonella foenum-fotecum, benzyl acetate, soy lecithin, silicone derivate organosiloxanes type and polymeric adjuvant, Zingiber officinale, Cinnamomum verum, citral, benzyl benzoate, soy lecithin, silicone derivate organosiloxane type and polymeric adjuvant, Zingiber officinale, Cinnamomum verum, benzyl Acetate, geraniol, soy lecithin, silicone derivate organosiloxane type and polymeric adjuvant, Zingiber officinale, Cinnamomum verum, Papaver somniferum, soy lecithin, silicone derivate organosiloxane type and polymeric adjuvant, Zingiber officinale, Cinnamomum verum, Satureja montana essential oil, Satureja montana extract, soy lecithin, silicone derivative organosiloxane type and polymeric adjuvant; and Zingiber officinale, E-cinnamaldehyde, geranyl acetate, soy lecithin, silicone derivate organosiloxane type and polymeric adjuvant.

The present invention also relates to an end-application-solution comprising the biopesticidal composition defined above diluted with a solvent, preferably aqueous and more preferably water.

The concentration of each component of bioactive core in the end-application-solution ranges:

Essential oil, oleoresin, aqueous, alcoholic or hydroalcoholic root or rhizome extract from Zingiber officinale Roscoe: 0.1-99.8%, preferably 5-30%, and more preferably 10-25%, cinnamaldehyde or cinnamaldehyde source: 0.1-99.8%, preferably 10-60%, and more preferably 30-50%, and soy lecithin present in solid, liquid or fluid or hydrolyzed or partially hydrolyzed form: 0.1-99.8%, preferably 30-80%, and more preferably 30-50%."

The main technical advantages of the biopesticidal compositions disclosed are:

They exhibit high efficacy and specificity in fly control and at lower doses compared to:

The individual active elements (extracts, oils, molecules) taking into account both the values obtained within this invention and those reported in the state of the art.

Other natural and synthetic compounds and/or formulations of known activity.

They have multiple, non-toxic modes of action against flies (contact-antifood-repellence oviposition).

Eliminate and/or retard the onset of cross-resistance.

The selected plant species exhibit great biodiversity and sustainability in the crop, ensuring availability of the material in first steps in the process.

In the case of active ingredients, they are not expected to be toxic to humans and animals or plants, taking into account:

Their occurrence in nature.

Their food and pharmacological uses.

Natural human exposure history and environment.

In some cases, obtaining the extract as a component of some biopesticide compositions constitutes an alternative to valuing a plant material with little or no commercial value and is managed as a residue in the processing of the agri-food industry.

The disclosed optimized extraction and formulation process is clean, fast, efficient and easily scalable resulting in a reduction in the final cost of the product on the market.

A further object of the invention constitutes the process of obtaining the biopesticide composition of the invention comprising to mix in aqueous medium bioactive core components:

Essential oil, oleoresin, aqueous alcoholic or hydroalcoholic root extract or rhizome of Zingiber officinale Roscoe and Cinnamaldehyde or cinnamaldehyde source.

soy lecithin present in solid, liquid form or fluid or hydrolyzed or partially hydrolyzed In a previous step to the process for obtaining the bioactive core, essential oil, oleoresin, aqueous, alcoholic, or hydroalcoholic extract of Zingiber officinale Roscoe may be obtained by maceration, percolation, decoction, infusion, hydrodistillation-Clevenger; extraction assisted by ultrasounds, by microwaves, by supercritical fluids;

Soxhlet extraction, extrusion, entrainment (direct, indirect, pressurized and/or vacuum) or solvent extraction (hot or cold) and preferably in a colloid mill multifunctional dispersion system.

Alternatively, the cinnamaldehyde source can be obtained by distillation of a species as indicated above. Cinnamaldehyde may be encapsulated previously to formulate bioactive core. Finally, soy lecithin present in solid, liquid form or fluid or hydrolyzed or partially hydrolyzed.

A given order of addition of the components requires that essential oil, oleoresin, aqueous alcoholic or hydroalcoholic root extract or rhizome of Zingiber officinale Roscoe are added to water first followed by cinnamaldehyde or cinnamaldehyde source and lecithin. (Example 1).

Optionally, the biopesticidal compositions are obtained from the ordered mixture and in specific proportions, of the synergistic bioactive core, at least one secondary component and/or at least one inert substance. They are subsequently added to the mixture in an orderly fashion and with a period of agitation following the addition of each component.

Mixing of the components of bioactive core is performed at a speed ranging between 500 and 4000 rpm, preferably between 1500 and 3000 rpm. Mixing occurs in aqueous media.

The temperature of the mixture is between 20 and 40° C., preferably between 24 and 35° C. and for a period comprised between 30 and 120 minutes, preferably 40 and 100 minutes.

The process manufacturing of the biopesticide compositions may be carried out in the apparatuses or reactors commonly used to carry out these tasks in the field of the art.

A further object of the invention constitutes the use of biopesticidal compositions for the control of fly pests.

In particular, whitefly group, preferably those belonging to the genera *Bemisia* sp. "complex" (biotypes) *Dialeurodes* sp., *Trialeurodes* sp. *Encarsia* sp., *Aleurolobus* sp., *Aleurothrixus* sp., *Aleurodicus* sp., *Aleyrodes* sp., *Parabemisia* sp., *Paraleyrodes* sp., *Orchamoplatus* sp., *Siphoninus* sp., and *Tetraleurodes* sp.

The elements of the biopesticidal compositions act synergistically, additively, polyvalent and/or powerfully.

Biopesticides have a prolonged effect by a controlled release mechanism.

The biopesticide composition may be used:

Preventatively and/or

Curative, to high infestation conditions with risk of crop loss.

In addition, biopesticides may be applied individually or in combination with other plant protection products or pest and disease control systems.

By other plant protection products or pest control systems meaning any kind of insecticides, nematicides, acaricides, fungicides, bactericides, herbicides, plant growth regulators, elicitors, fertilizers, soil conditioners, and baits among others.

Application of the biopesticide composition can be by foliar spray.

In another particular embodiment applications of biopesticide compositions are performed on food and non-food agricultural crops, either conventional, organic or ecological agriculture, preferably on horticultural, field and ornamental crops and gardening, as well as parks and sports facilities.

In another particular embodiment applications are made in greenhouse and in open field, as well as gardens and green areas of sports and recreational facilities.

The dose of biopesticide composition may increase or decrease depending on the type of formulation, type and intensity of attack by the pest to be controlled, crop and country of use.

Mechanisms and Definition of Modes of Action

Mode of action (MoA) refers to the specific physical and/or biochemical interaction through which a biopesticide produces its effect.

To determine modes and mechanisms of action, a set of microassays (in vitro and in vivo) developed and/or adapted from the scientific literature (e.g., assays of choice vs. non-choice, direct spray, ingestion toxicity, Y-tube olfactometer bioassay, priming bioassays, microscopy, etc.) were employed. Preferably, the following bioassays are conducted:

Mortality from contact assay: The objective is to evaluate the effect of different substance doses on adult mortality and whitefly immature states by topical application.

Settling inhibition assays: The target is to evaluate the effect of different substance doses on the behavior (settling) of whitefly adults. It is based on the preference of flies for treated and untreated plants located in the same entomological box (choice trials) or different (non-choice).

Oviposition inhibition assays: The target is to evaluate the effect of different doses of the substance on egg lay of whitefly adults. It is based on preference for ovipositing flies on treated and untreated plant surfaces located in the same entomological (choice trials) or different (non-choice) boxes.

Spatial repellency assays: The objective is to measure the substance's ability to inhibit whitefly adult preference for its host plant (olfactometer assays).

The following were taken into account in the assay protocols:

Each of the active elements of the biopesticidal compositions are tested separately and combinations between them.

Each of the biopesticidal compositions is assayed.

For each of the elements making up the disclosed compositions, and for each of the biopesticidal compositions dose-response assays were conducted and CE/LC 50 (dose at which 50% of the effect studied occurs) was calculated.

Considering the results obtained, it is concluded that the active elements and/or biopesticidal compositions evaluated act by two main modes of action:

Mode of Action 1: Knock down effect. The mechanisms of action involved in this mode of action are:

Fly airway blocked (choking death).

Destruction of the exoskeleton wax layer (dehydration death).

Destructuring of the cell membrane (osmotic shock).

Mode of Action 2: Action on fly olfactory receptors and taste. The mechanisms of action involved in this mode of action are:

Antifeeding effect: Inhibition of feeding by interaction of the components of the composition with taste receptors.

Repellent Effect: Strong repellent effect by controlled release of the encapsulated volatile components and their Interaction with olfactory receptors.

Inhibition of oviposition: Reducing lay on eggs significantly by interacting the components of the composition with adult chemoreceptors.

The mechanisms and modes of action for each of the elements of the bioactive core are summarized in Table 2.

TABLE 2

| Mechanisms and modes of action for each of the elements of bioactive core | | | |
| --- | --- | --- | --- |
| Mode of action | Mechanism of action | Involved active ingredient | Secondary ingredient |
| Mortality from contact | Blocking of Tracheal spiracles | *Zingiber officinale* | Soy lecithin |
| | Destructuring of cuticle/ membranes | *Zingiber officinale* | Cinnamaldehyde source |

TABLE 2-continued

Mechanisms and modes of action for each of the elements of bioactive core

| Mode of action | Mechanism of action | Involved active ingredient | Secondary ingredient |
|---|---|---|---|
| Antifeeding effect | Settling Inhibition | Cinnamaldehyde source | *Zingiber officinale* |
| | Inhibition of oviposition | Cinnamaldehyde source | |
| | Direct Repellent | Cinnamaldehyde source | |

The ingredients of bioactive core present a complex chemical composition associated with a large multifunctionality in terms of mechanisms of action. The combination of the proposed mechanisms of action (physical and behavioral) determines the effectiveness of bioactive core and minimizes the risk of occurrence of cross-resistance. This efficacy is enhanced by the addition of at least one second active component as well as inert co-formulants (substances) which contribute to the increased stability of the composition and promote the controlled release of the active ingredients.

BRIEF DESCRIPTION OF THE FIGURES

FIGS. 9A and 9B: Chromatogram (GC-MS-MS) of pure (A) and encapsulated (B) *Cinnamomum zeylanicum* essential oil.

FIG. 11: EXPERIMENTAL DESIGN AND DISTRIBUTION OF EXPERIMENTAL AND SAMPLING PLOTS IN field trial of WF_F4 composition versus whitefly in eggplant.

APPLICATION EXAMPLES

Figure 1:
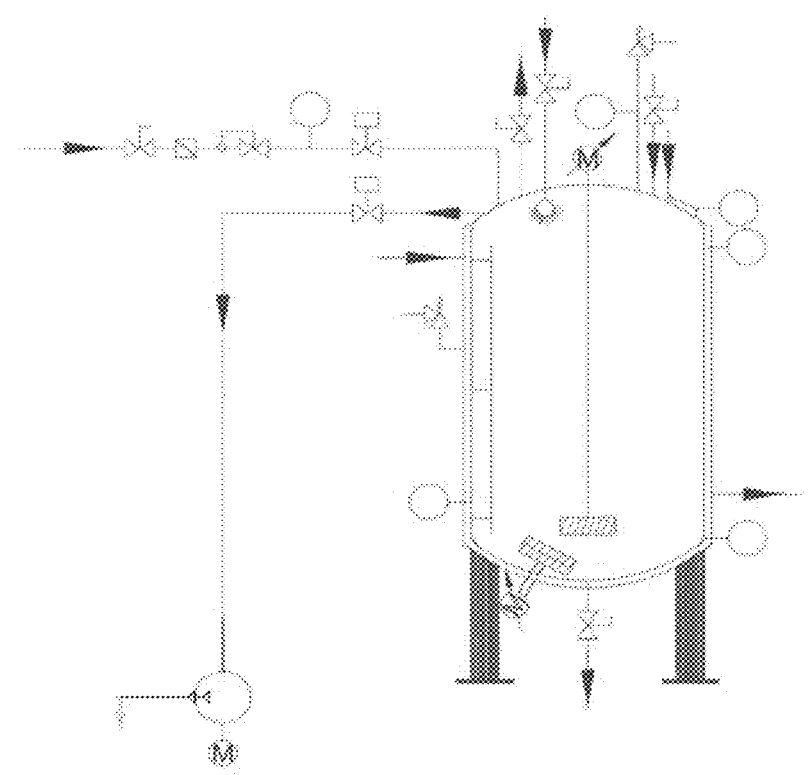
FIG. 1: Formulation Reactor.
Figure 1:
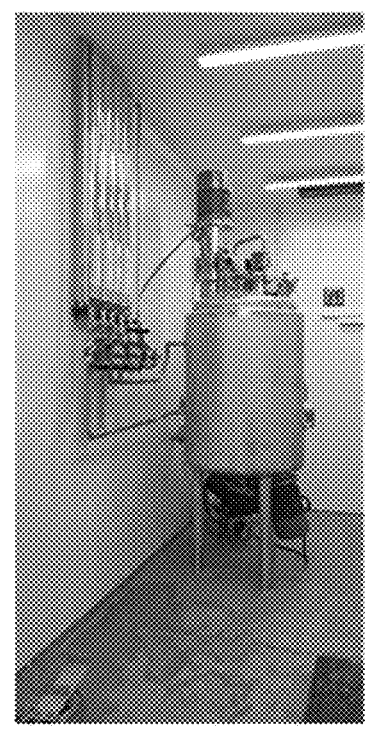
Figure 1:
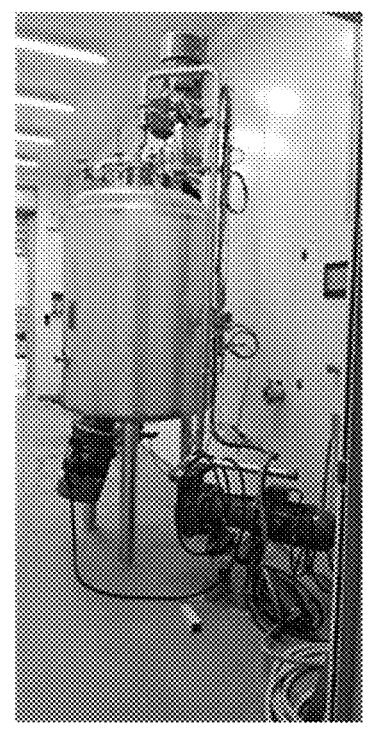

The following figures, diagrams, tables, and examples are shown by way of illustration and not limitation of the present invention.

Example 1. Obtaining Bioactive Core

Several examples of biopesticide compositions disclosed within the framework of this patent are included in Table 3.

As one specific example the bioactive core (Composition M1, Table 3) comprises a 7.5% hydroalcoholic extract of *Zingiber officinale* roots/rhizomes, 10% essential oil of *Cinnamomum verum* J. Presl. (syn., *C. zeylanicum* Blume), as cinnamaldehyde source (CAS 8015-91-6) in water, and 17,5% soy lecithin (CAS 8002-43-5). The essential oil can be incorporated in a free form (100% essential oil) and/or partially or fully encapsulated with an encapsulating agent. In one specific example, the encapsulating agent is β-cyclodextrin. The process of obtaining, following the general steps described above, is detailed below:

Mixing of the bioactive core elements is carried out in a stainless-steel reactor (FIG. 1) with a total capacity of 650 liters and a useful capacity of 560 liters. It has a double jacket through which a heat exchanger fluid circulates to control the temperature inside the tank through a PT100 sensor. The reactor is equipped with two agitators: a central disc cowles stirrer (maximum speed of 1500 rpm) and a high-speed emulsifier (3,000 rpm, ultra-turrax type) located at the bottom of the reactor. Both agitators are independently controlled to achieve specific speed and rotation control for each ingredient and time during the mixing process. In addition, the reactor is connected to a vacuum pump that is used to remove air bubbles that form in the product and prevent the formation of gas-liquid interfaces. It also features an inert gas injection system to prevent work in the presence of oxygen and thereby prevent oxidative processes. Finally, the reactor features a cleaning in place cleaning system for automatic cleaning.

Considering the characteristics of the reactor (FIG. 1), the elements of the bioactive core are carefully added in a certain order, adjusting the temperature and rotation variables of each agitator such as detailed in Table 4.

TABLE 3

Several examples of biopesticide compositions disclosed within the present of invention

| | Percentages (% p/v) of active ingredient in the biopesticide composition Code of the biopesticide compositions | | | | | | | | | | | | |
|---|---|---|---|---|---|---|---|---|---|---|---|---|---|
| Ingredient | M1 | M4 | WF_F4 | ADI-23 | PW1.5 | MxM14 | MxM15 | MxM22 | MxM5 | MxM19 | MxM12 | MxM16 | MxM25 |
| Bioactive core | | | | | | | | | | | | | |
| Hydroalcoholic root/rhizome extract of *Zingiber officinale* Roscoe | 7.5 | 1.0 | 7.5 | 7.0 | 3.0 | 1.0 | 1.0 | 1.0 | 1.0 | 1.0 | 1.0 | 1.0 | 1.0 |

TABLE 3-continued

Several examples of biopesticide compositions disclosed within the present of invention Percentages (% p/v) of active ingredient in the biopesticide composition
Code of the biopesticide compositions

| Ingredient | M1 | M4 | WF_F4 | ADI-23 | PW1.5 | MxM14 | MxM15 | MxM22 | MxM5 | MxM19 | MxM12 | MxM16 | MxM25 |
|---|---|---|---|---|---|---|---|---|---|---|---|---|---|
| Essential oil *Cinnamomum cassia* leaf | | | | 2.5** | | 0.5 | 0.5 | 0.5 | | | | | |
| Essential oil *Cinnamomum verum* leaf (CAS 8015-91-6) | 10.0 | 12.5 | 16.0* | | 2.5 | | | | 0.5 | 0.5 | 0.5 | 0.5 | |
| E-cinnamaldehyde (pure compound) | | | | | | | | | | | | | 12.5 |
| Second component | | | | | | | | | | | | | |
| Hydroalcoholic seed extract *Persea americana* | | | | 13.5 | 7.0 | | | | | | | | |
| Essential oil *Cymbopogon citratus* leaf (CAS 8007-02-1) | | | | 10.0 | | | | | | | | | |
| Hydroalcoholic extract *Cassia angustifolia* | | | | | | | 20.0 | | | | | | |
| Essential oil *Satureja montana* | | | | | | | | | | | | 7.5 | |
| Hydroalcoholic extract *Satureja montana* | | 20.0 | | | | | | | | | | 12.5 | |
| Hydroalcoholic extract *Mentha piperita* | | | | | | 20.0 | | | | | | | |
| Hydroalcoholic extract *Trigonella foenum-graecum* | | | | | | | | 12.5 | | | | | |
| Hydroalcoholic extract *Papaver somniferum* | | | | | | | | | | | 20.0 | | |
| Citral (pure compound) | | | | | | | | | 12.5 | | | | |
| Benzyl acetate (pure compound) | | | | | | | | 10.0 | | 20.0 | | | |
| Benzyl benzoate (pure compound) | | | | | | | | | 20.0 | | | | |
| Geraniol (CAS 106-24-1, (pure compound) | | | | | | | | | | 15.0 | | | |
| Geranyl acetate (pure compound) | | | | | | | | | | | | | 12.5 |
| *Aspergillus* sp. (Fermentation) | | | | | 44.5 | | | | | | | | |
| Soy lecithin (CAS 8002-43-5) | 17.5 | 17.5 | 17.5 | 10.0 | 17.5 | 17.5 | 17.5 | 17.5 | 17.5 | 17.5 | 17.5 | 17.5 | 17.5 |
| Inert substances | | | | | | | | | | | | | |
| Tween-80 (emulsifier) | | | | 7.5 | | | | | | | | | |
| Derivative organosiloxanes type (CAS 67674-67-3) (adjuvant) | | | 13.0 | 12.0 | 12.0 | 13.0 | 13.0 | 13.0 | 13.0 | 13.0 | 13.0 | 13.0 | 13.0 |
| Carboxymethyl cellulose (CAS 900-34-6/9004-32-4 Thixotropic agents | | | | 1.0 | | | | | | | | | |
| β-cyclodextrin (CAS 7585-39-9, encapsulating agent) | | | 10.0 | 7.5 | | | | | | | | | |
| Polymeric adjuvant, (Atlas ™ G5002L) | | | 10.0 | 2.5 | 13.5 | 10.0 | 10.0 | 10.0 | 10.0 | 10.0 | 10.0 | 10.0 | 10.0 |

*16% essential oil *C. verum* is composed of; 13% pure essential oil and 3% essential oil encapsulated by 10% β-cyclodextrin.

**2.5% essential oil *C. cassia* is encapsulated by 6.5% β-cyclodextrin.

Example 2. Obtaining Biopesticidal Compositions

Each biopesticide composition is formulated according to a specific mixing order based on the nature of the active elements and co-formulants composing it. The elements of bioactive core are employed in the final composition in two ways:

(1) They are included individually and in the corresponding order during the process of formulating the biopesticide composition.

(2) It is pre-mixed and then added to the final formulated in the corresponding ratio and order depending on the biopesticide composition.

The procedure consists of the following general steps:

a. Selection of raw materials

Active elements

Bioactive Core (first component)

Second component (s)

Inert substances

Emulsifier

Adjuvant

Stabilizer

Preservative

Encapsulant

Flavor

Antifoam b. Encapsulation (if applicable) of active ingredient(s)

c. Formulation (mixing of ingredients)

Several examples of biopesticide compositions disclosed within the framework of this patent are listed in Table 3. An example of the procedure for obtaining each of the variants (compositions M4, WF_f 4, ADI-23, PW-1.5, and MxM5) is detailed below. This process is extensive for the rest of the compositions listed in Table 3 (MxM14, MxM15, MxM22, MxM19, MxM12, MxM16 and MxM25).

TABLE 4

| | | Mixing order and general conditions for processing composition M1 compressing of bioactive core | | | | | |
|---|---|---|---|---|---|---|---|
| Ingredient | Agitation (rpm) | Vacuum inside reactor | % (p/v) | Order | Mixing time (min.) | Temperature |
| Essential oil of *Cinnamomum verum* (100% CAS 8015-91-6) | Cowles/700 rpm | 760 mbar | 10.0 | 1 | 1 | 25° C. |
| Soy lecithin CAS 8002-43-5 | Cowles/1000 rpm Turrax/1000 rpm | 500 mbar | 7.5 | 2 | 10 | 35° C. |
| Hydroalcoholic root/rhizome extract of *Z. officinale* | Cowles/1000 rpm Turrax/3000 rpm | 500 mbar | 7.5 | 3 | 10 | 35° C. |
| Water and continuous agitation | Cowles/1000 rpm Turrax/3000 rpm | 500 mbar | 65.0 | 4 | 40 | 25° C. |

2.4 Biopesticide Composition Formed by Bioactive Core and Two Second Components.

An example of biopesticide composition (composition M4, Table 3) bioactive core (1% of *Z. officinale* hydroalcoholic extract, 12.5% of *C. verum* essential oil, as cinnamaldehyde source and 17.5% of soy lecithin) is blended with 20% of *Satureja montana* hydroalcoholic extract (second components) to make composition M4 (Table 3).

Considering the reactor characteristics described in Example 1, the elements of bioactive core and the adjuvant (organosilicone derivative) are carefully added in a certain order, adjusting the temperature and rotation variables of each agitator as detailed in Table 5.

TABLE 5

| | | Mixing order and general conditions for processing composition M4 compressing of bioactive core and second component | | | | | |
|---|---|---|---|---|---|---|---|
| Ingredient | Agitation (rpm) | Vacuum inside reactor | % (p/v) | Order | Mixing time (min.) | Temperature |
| Essential oil of *C. verum* (100% CAS 8015-91-6) | Cowles/700 rpm | 760 mbar | 12.5 | 1 | 1 | 25° C. |
| Soy lecithin (CAS 8002-43-5) | Cowles/1000 rpm Turrax/1000 rpm | 500 mbar | 17.5 | 2 | 10 | 35° C. |

TABLE 5-continued

Mixing order and general conditions for processing composition
M4 compressing of bioactive core and second component

| Ingredient | Agitation (rpm) | Vacuum inside reactor | % (p/v) | Order | Mixing time (min.) | Temperature |
|---|---|---|---|---|---|---|
| Hydroalcoholic root/rhizome extract of *Z. officinale* | Cowles/1000 rpm Turrax/3000 rpm | 500 mbar | 1.0 | 3 | 10 | 35° C. |
| *S. montana* hydroalcoholic extract | Cowles/1000 rpm Turrax/1000 rpm | 500 mbar | 20.0 | 4 | 10 | 35° C. |
| Water and continuous agitation | Cowles/1000 rpm Turrax/3000 rpm | 500 mbar | 67.5 | 5 | 40 | 25° C. |

2.5 Biopesticide Composition Formed by Bioactive Core and Inert Substances

2.5.1. Composition WF_F4

One example of biopesticide composition, bioactive core (7.5% *Z. officinale* hydroalcoholic extract, 16.0% *C. verum* essential oil, as cinnamaldehyde source, and 17.5% soy lecithin) is blended with 13% of organosilicone adjuvant and 10% of polymeric adjuvant acting as a dispersing agent. In this particular case, 13% of *C. verum* essential oil is added in free 3% of *C. verum* essential oil is added encapsulated in 10% of β-cyclodextrin to make composition WF_F4 (Table 3).

Considering the reactor characteristics described in example 1, the elements of bioactive core and remaining inert substances are carefully added in a certain order, adjusting the temperature and rotation variables of each agitator as detailed in Table 6.

2.5.2. ADI-23 Composition

One example of biopesticide composition, bioactive core (7% *Z. officinale* hydroalcoholic extract, 2.5% *C. cassia* essential oil, as cinnamaldehyde source, and 17.5% soy lecithin) is blended with 13.5% Hydroalcoholic extract from *Persea americana,* 10% essential oil from *Cymbopogon citratus* and inert substances. In this particular case, *P. americana* extract and *C. citratus* essential oil are also considered as a second component.

Considering the reactor characteristics described in example 1, the elements of bioactive core, second components, and the remaining inert substances are carefully added in a certain order, adjusting the temperature and rotation variables of each agitator as detailed in Table 7.

TABLE 6

Mixing order and general conditions for processing composition
WF_F4 compressing of bioactive core and inert substances

| Ingredient | Agitation (rpm) | Vacuum inside reactor | % (p/v) | Order | Mixing time (min.) | Temperature |
|---|---|---|---|---|---|---|
| Essential oil *Cinnamomun. verum* leaf (Without *C. zeylanicum* CAS 8015-91-6) | Cowles/700 rpm | 760 mbar | 13.0 | 1 | 1 | 25° C. |
| Essential oil of *C. verum* (CAS 8015-91-6) encapsulated* | Cowles/1000 rpm Turrax/1000 rpm | 760 mbar | 13.0 | 2 | 15 | 35° C. |
| Organosilicone adjuvant (CAS 67674-67-3) | Cowles/1000 rpm | 760 mbar | 13.0 | 3 | 3 | 35° C. |
| Polymeric adjuvant (Atlas ™G5002L) | Cowles/1000 rpm Turrax/1000 rpm | 760 mbar | 10.0 | 4 | 3 | 35° C. |
| Lecithin (CAS 8002-43-5) | Cowles/1000 rpm Turrax/1000 rpm | 500 mbar | 17.5 | 5 | 10 | 35° C. |
| Hydroalcoholic root/rhizome extract of *Z. officinale* | Cowles/1000 rpm Turrax/3000 rpm | 500 mbar | 7.5 | 6 | 5 | 25° C. |
| Water and continuous agitation | Cowles/1000 rpm Turrax/3000 rpm | 500 mbar | 26.0 | 7 | 30 | 25° C. |

*13% encapsulated ingredient is composed of 3% *C. verum* essential oil and 10% encapsulating agent β-cyclodextrin.

TABLE 7

| | | | | | | |
|---|---|---|---|---|---|---|
| | | Vacuum | | | Mixing | |
| | Agitation | inside | | | time | |
| Ingredient | (rpm) | reactor | % (p/v) | Order | (min.) | Temperature |
| 1% of Carboxymethylcellulose diluted in water | Cowles/700 rpm | 760 mbar | 27.5 | 1 | 1 | 25° C. |
| Organosilicone adjuvant (CAS 67674-67-3) | Cowles/1000 rpm | 760 mbar | 12.0 | 2 | 3 | 25° C. |
| Soy lecithin (CAS 8002-43-5) | Cowles/1000 rpm Turrax/1000 rpm | 500 mbar | 10.0 | 3 | 10 | 35° C. |
| Essential oil *Cymbopogon citratus* leaf (CAS 8007-02-1) | Cowles/700 rpm | 760 mbar | 10.0 | 4 | 10 | 35° C. |
| Hydroalcoholic root/rhizome extract of *Z. officinale* | Cowles/1000 rpm Turrax/3000 rpm | 500 mbar | 7.0 | 5 | 10 | 35° C. |
| *Persea americana* hydroalcoholic extract | Cowles/1000 rpm Turrax/1000 rpm | 500 mbar | 13.5 | 6 | 10 | 35° C. |
| Essential oil of *C. cassia* leaf encapsulated* | Cowles/1000 rpm Turrax/1000 rpm | 760 mbar | 10.0 | 7 | 15 | 35° C. |
| Polymeric adjuvant (Atlas ™G5002L) | Cowles/1000 rpm | 760 mbar | 2.5 | 8 | 5 | 25° C. |
| Emulsifier(Tween ®) and continuous agitation | Cowles/1000 rpm | 760 mbar | 7.5 | 9 | 5 | 25° C. |

*10% encapsulated ingredient is composed of 2.5% *C. cassia* essential oil and 7.5% encapsulating agent β-cyclodextrin

2.5.3. Composition PW-1.5

One example of biopesticide composition, bioactive core (3% *Z. officinale* hydroalcoholic extract, 2.5% *C. verum* essential oil, as cinnamaldehyde source and 17.5% soy lecithin) is mixed with 7% *Persea americana* hydroalcoholic extract, 47.7% product obtained from *Aspergillus niger* fermentation and inert substances. In this particular case, *P. americana* extract and *Aspergillus* fermentation product and lecithin are considered as second components. Considering the reactor characteristics described in example 1, the elements of bioactive core, second components, and the remaining inert substances are carefully added in a certain order, adjusting the temperature and rotation variables of each agitator as detailed in Table 8.

TABLE 8

Mixing order and general conditions for processing composition PM-1.5

| | | | | | | |
|---|---|---|---|---|---|---|
| | | Vacuum | | | Mixing | |
| | Agitation | inside | | | time | |
| Ingredient | (rpm) | reactor | % (p/v) | Order | (min.) | Temperature |
| Product obtained from *Aspergillus niger* fermentation | Cowles/700 rpm | 760 mbar | 44.5 | 1 | 1 | 25° C. |
| Organosilicone adjuvant (CAS 67674-67-3) | Cowles/1000 rpm | 760 mbar | 12.0 | 2 | 3 | 25° C. |
| Soy lecithin (CAS 8002-43-5) | Cowles/1000 rpm Turrax/1000 rpm | 500 mbar | 17.5 | 3 | 10 | 35° C. |
| Essential oil *Cinnamomun. verum* leaf (Without *C. zeylanicum* CAS 8015-91-6) | Cowles/700 rpm | 760 mbar | 2.5 | 4 | 10 | 35° C. |
| Hydroalcoholic extract of *Z. officinale* | Cowles/1000 rpm Turrax/3000 rpm | 500 mbar | 3.0 | 5 | 15 | 35° C. |
| *Persea americana* hydroalcoholic extract | Cowles/1000 rpm Turrax/1000 rpm | 500 mbar | 7.0 | 6 | 10 | 35° C. |
| Polymeric adjuvant (Atlas ™G5002L)and continuous agitation | Cowles/1000 rpm | 760 mbar | 13.5 | 7 | 30 | 25° C. |

2.5.4. Composition MxM5

One example of biopesticide composition, bioactive core (1% *Z. officinale* hydroalcoholic extract, 0.5% *C. verum* essential oil as cinnamaldehyde source, and 17.5% soy lecithin) is blended with 12.5% citral, 20% benzyl benzoate, and inert substances. In this particular case, pure compounds citral and benzyl benzoate are considered second components. Considering the characteristics of the reactor described in example 1, the elements of bioactive core, second components, and inert substances are carefully added in a certain order, adjusting the temperature and rotational variables of each agitator as detailed in Table 9.

Figure 2:
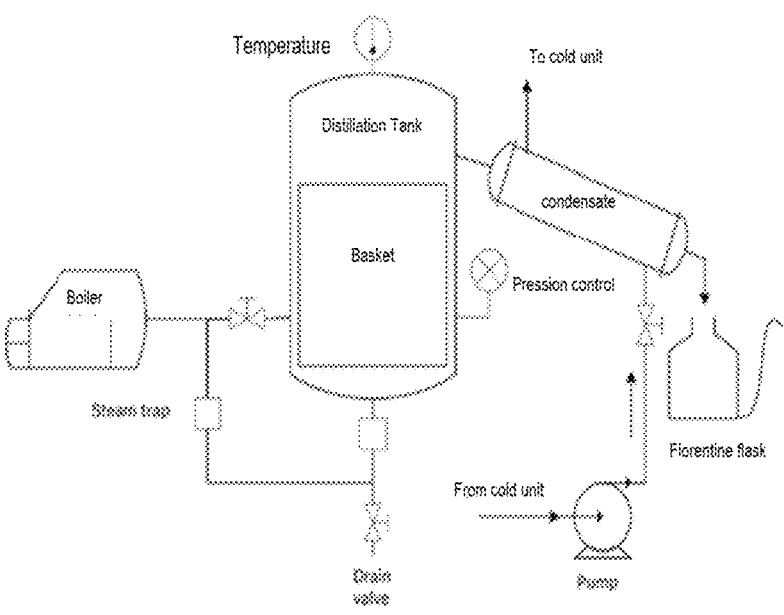
FIG. 2: Entrainment process diagram.

Chromatography coupled to Mass Spectrometry (GC-MS). A typical diagram of the steam stripping process is shown in FIG. 2.

C. Fermentation

*Citrus* dry solid tailings (barks, hulls, pulp), the original plant material selected from those cited in examples 1-2, and/or tailings from the extraction process thereof are subjected to a fermentation process and subsequent extraction. To do so, raw material, in a percentage between 10-15%, is incubated in water with one of the different selected microorganisms (*Bacillus* sp., *Pseudomonas* sp., *Trichoderma* sp., and *Aspergillus* sp.) for 120 h at 28° C.-30° C. in a F3-100

TABLE 9

Mixing order and general conditions for processing composition MxM5

| Ingredient | Agitation (rpm) | Vacuum inside reactor | % (p/v) | Order | Mixing time (min.) | Temperature |
|---|---|---|---|---|---|---|
| Water | Cowles/700 rpm | 760 mbar | 25.5 | 1 | 1 | 25° C. |
| Organosilicone adjuvant (CAS 67674-67-3) | Cowles/1000 rpm | 760 mbar | 13.0 | 2 | 3 | 25° C. |
| Lecithin (CAS 8002-43-5) | Cowles/1000 rpm Turrax/1000 rpm | 500 mbar | 17.5 | 3 | 10 | 35° C. |
| Essential oil *Cinnamomun. Verum* leaf (Without *C. zeylanicum* CAS 8015-91-6) | Cowles/700 rpm | 760 mbar | 0.5 | 4 | 10 | 35° C. |
| Hydroalcoholic root/rhizome extract of *Z. officinale* | Cowles/1000 rpm Turrax/3000 rpm | 500 mbar | 1.0 | 5 | 10 | 35° C. |
| benzyl benzoate | Cowles/700 rpm | 760 mbar | 20.0 | 6 | 10 | 35° C. |
| citral | Cowles/700 rpm | 760 mbar | 12.5 | 7 | 10 | 35° C. |
| Polymeric adjuvant (Atlas ™G5002L)and continuous agitation | Cowles/1000 rpm | 760 mbar | 10.0 | 8 | 30 | 25° C. |

Example 3. Second Components Obtaining Methodology

The plant material described in example 2 is subjected to different extraction processes to obtain the second components, both those which make up bioactive core and those which are used as second component.

A) Aqueous, Alcoholic v/o Hydroalcoholic Extracts

Water is employed for aqueous extraction. In the case of alcohol extraction, a solvent extraction, preferably ethanol, isopropanol or benzyl alcohol, is employed. The extraction method is chosen among maceration (cold or hot, resting or shaken), infusion, percolation, decoction, reflux, ultrasound, microwave, Soxhlet and preferably an extraction by an advanced multifunctional dispersion technology with colloid mill, which the principle of operation is a rotor/stator system. Chemical profiles of the extracts are determined by Gas Chromatography coupled Mass Spectrometry (GC-MS) and Liquid Chromatography coupled Mass Spectrometry (LC-MS).

B) Essential Oils

Figure 3:
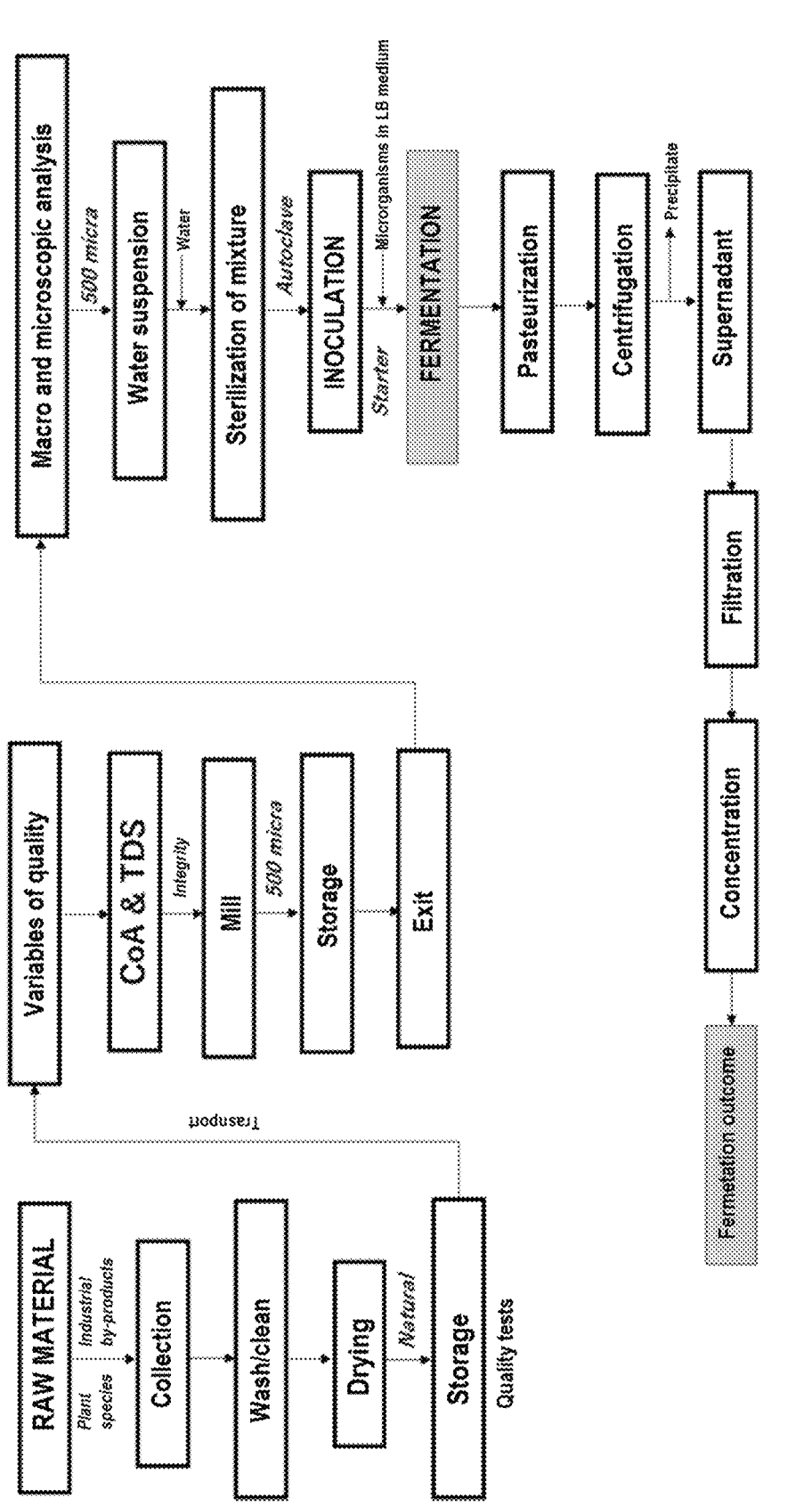
FIG. 3: Fermentation process flow diagram.

Oils are obtained by hydrodistillation, maceration in non-polar solvents (example, acetone, hexane, dichloromethane, petroleum ether), extraction by supercritical fluids and preferably by steam stripping distillation according to the methodologies described in the European Pharmacopoeia (Ph. Eur. 8.0. 2013, ISBN: 978-92-871-7525-0, 3513 pp.) under certification UNE EN ISO 9001: 215. The chemical profiles of essential oils are determined by Gas fermenter (Bionet, Murcia, Spain). Following incubation, the fermentation is centrifuged at 5000 rpm for 5 min (Hitachi Himac CR22N) and filtered through a mesh or fabric filter. The resulting liquid is ready for use in the formulation. The general process is detailed in the flowchart of FIG. 3.

D. Bio-Targeted Chemical Fractionation

Figure 4:
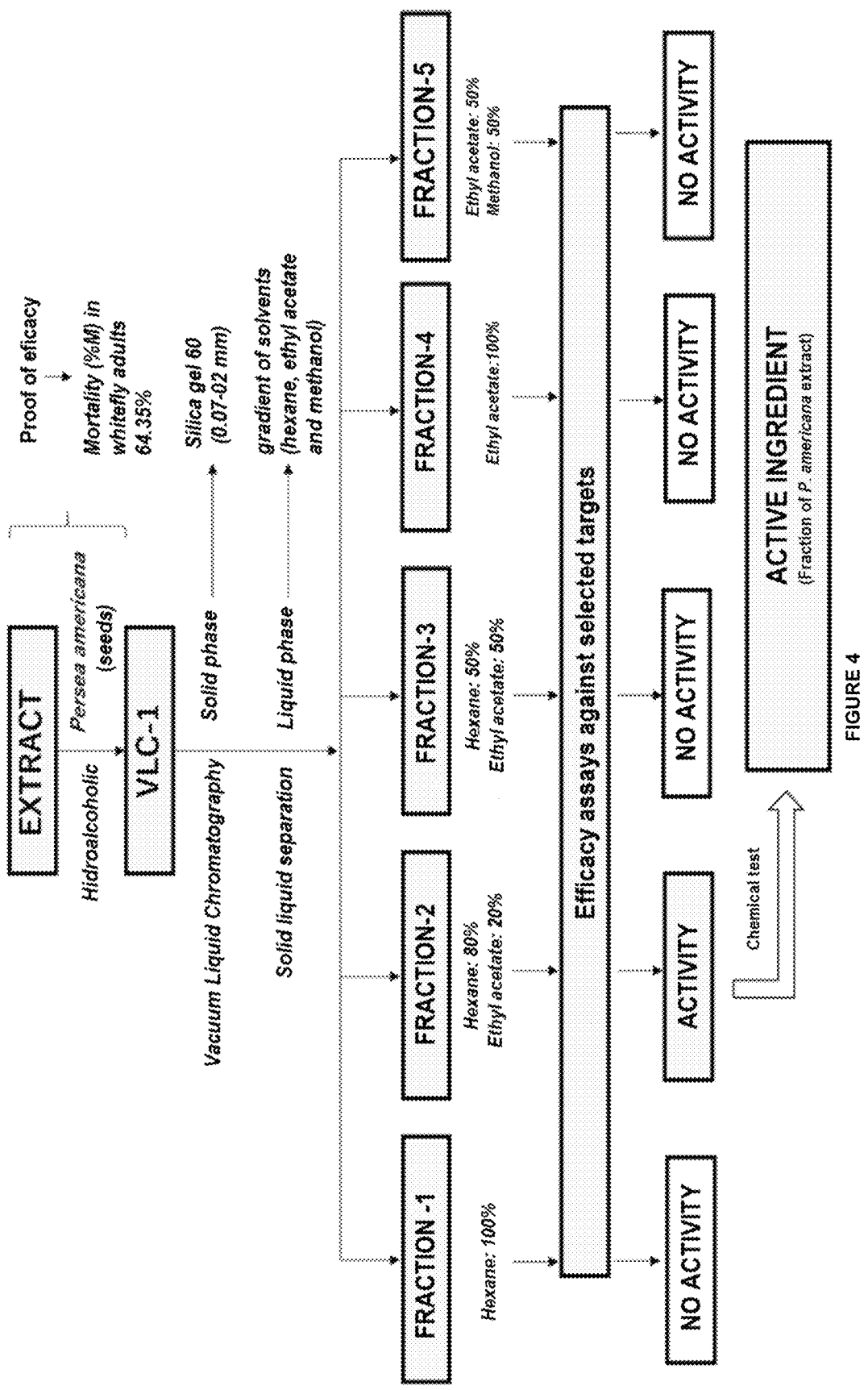
FIG. 4: Scheme of bio-directed chemical fractionation.

Within the framework of this invention, a bioassay-guided chemical fractionation of aqueous, alcoholic and/or hydroalcoholic extracts in need thereof is performed. This is accomplished by employing conventional and advanced extraction/separation techniques well known in the specialized literature. These include liquid-liquid extraction, vacuum liquid chromatography (VLC), column chromatography (CC), solid phase chromatography (example: Silica, Sephadex), preparative high-performance liquid chromatography (pHPLC), and supercritical fluids. A concrete example of obtaining a bioactive fraction from *Persea americana* extract is described in FIG. 4.

Example 4. Cinnamaldehyde Encapsulation Process

This process holds true for the encapsulated cinnamaldehyde source in the bioactive core and for any encapsulated of the second component of the biopesticide composition.

The encapsulation process is carried out in a reactor identical to that described in example 1 (FIG. 1).

Following, the encapsulation process of *C. verum* as a cinnamaldehyde source is described below. This is done by adding 450 liters of water to the reactor at 25° C. Subsequently, 45 Kg of β-cyclodextrin (encapsulating agent) is slowly incorporated and kept for 30 minutes under vigorous stirring (Turrax shaker at 3000 rpm and Cowles shaker at 1000 rpm). The Turrax agitator is then stopped, and the Cowles agitator is set to 500 rpm, slowly adding 20 Kg of *C. verum* essential oil. The mixing is maintained under stirring conditions for 2 hours. After this time. The mixture is removed from the reactor and allowed to stand at 10° C. for 24 hours in a stainless-steel tank conditioned for this purpose. The mixture is then pumped (vacuum) to a sieve (42 micron) that separates the solid particles from the liquid. The liquid part is stored and used for new encapsulation processes and/or as water in formulating processes. The solids are spread into stainless steel trays of 1 cm thickness and dried at a controlled temperature of 35° C. for 24 hours more, till 12% humidity, ready for use in the formulation process of biopesticidal compositions.

Example 5. Dilution of the Biopesticidal Compositions

According to the number of products to be composed of the mixture, a specific mixing sequence is performed to avoid incompatibilities.

The preparation of end-application-solution is performed by diluting claimed biopesticidal composition in at least one solvent, preferably water. The amount of diluent and magnitude of dilution depends on the type of culture, volume of end-application-solution required, fly species and the level of infestation/damage at the time of application. As a rule, end-application-solution will be performed following the following steps:

Conditioning pH (5-7) and water hardness (soft).

Perform a premix in a given volume of solvent (example ⅓ of the tank) of the product(s) comprising the formulation. If more than one product is added, first the solid compounds are added and then the liquids compounds. According to the specifications and characteristics of each tank, premixtures to be agitated and held by the end user. The duration of the premixing will depend on the conditions of each user and the number of elements making up end-application-solution.

Add selected adjunct (if applicable).

Complete tank with appropriate amount of solvent at dose and keep agitating.

The disclosed biopesticide compositions are diluted in the range of 50-fold to 10000-fold. Examples of dilutions of the preparations shown in Examples 1 and 2 are shown below.

5.2. Dilutions of the Compositions Shown in Example 2.

Example 2 shows different examples of biopesticidal compositions comprising the bioactive core.

One example is the biopesticide composition M1 (Table 3, Example 2.1) containing bioactive core and lecithin. Some examples of the final concentration of elements in end-application-solution by applying different dilution factors are shown in Table 9.

TABLE 9

Example of composition dilutions M1 (bioactive core + lecithin as a second component)

| | | Bioactive core | | |
| | | Hydroalcoholic root/rhizome extract of | Essential oil *C. verum* leaf (without | |
| Dose (ml/L) | Dilution factor | *Z. officinale* (%) | *C. zeylanicum*) (%) | Lecithin (CAS 8002-43-5%) |
|---|---|---|---|---|
| 1 | X1000 | 0.007 | 0.01 | 0.017 |
| 2 | X500 | 0.015 | 0.02 | 0.035 |
| 4 | X250 | 0.030 | 0.04 | 0.070 |
| 6 | X166 | 0.045 | 0.06 | 0.105 |
| 8 | X125 | 0.060 | 0.08 | 0.140 |
| 10 | X100 | 0.075 | 0.10 | 0.175 |

Another example is the biopesticide composition M4 (Table 3, Example 2.1) containing bioactive core and one second component. Some examples of the final concentration of elements in end-application-solution by applying different dilution factors are shown in Table 10.

TABLE 10

Example of composition dilutions M4 (bioactive core + second component)

| | | Bioactive core | | | |
| | | Hydroalcoholic root/rhizome extract of | Essential oil *C. verum* leaf (CAS | Lecithin (CAS | Second component *S. montana* extract |
| Dose (ml/L) | Dilution factor | *Z. officinale* (%) | 8015-91-6, %) | 8002-43-5%) | (%) |
|---|---|---|---|---|---|
| 1 | X1000 | 0.001 | 0.012 | 0.017 | 0.02 |
| 2 | X500 | 0.002 | 0.025 | 0.035 | 0.04 |
| 4 | X250 | 0.004 | 0.05 | 0.070 | 0.08 |
| 6 | X166 | 0.006 | 0.075 | 0.105 | 0.12 |
| 8 | X125 | 0.008 | 0.1 | 0.140 | 0.16 |
| 10 | X100 | 0.01 | 0.125 | 0.175 | 0.20 |

Another example is the biopesticide composition WF_F4 (Table 3, Example 2.2.1. which contains bioactive core and inert substances. Some examples of the final concentration of elements in end-application-solution by applying different dilution factors are shown in Table 11.

TABLE 11

Example of composition dilutions WF_F4 (bioactive core + inert substances)

| | | Bioactive core | | | | | |
|---|---|---|---|---|---|---|---|
| Dose (ml/L) | Dilution factor | Hydroalcoholic root/rhizome extract of *Z. officinale* (%) | Essential oil *C. verum* leaf (CAS 8015-91-6, %) | Essential oil *C. verum* leaf (CAS 8015-91-6, %) *encapsulated | Lecithin (CAS 8002-43-5%) | Organosilicone adjuvant (CAS 67674-67-3, %) | Polymeric adjuvant (Atlas ™G5002L) |
| 1 | X1000 | 0.007 | 0.013 | 0.013 | 0.017 | 0.013 | 0.01 |
| 2 | X500 | 0.015 | 0.026 | 0.026 | 0.035 | 0.026 | 0.02 |
| 4 | X250 | 0.030 | 0.052 | 0.052 | 0.070 | 0.052 | 0.04 |
| 6 | X166 | 0.045 | 0.078 | 0.078 | 0.105 | 0.078 | 0.06 |
| 8 | X125 | 0.060 | 0.104 | 0.104 | 0.140 | 0.104 | 0.08 |
| 10 | X100 | 0.075 | 0.13 | 0.13 | 0.175 | 0.13 | 0.10 |

*Mixture of encapsulating agent (β-cyclodextrin) and *C. verum* essential oil

Another example is the biopesticide composition ADI-23 (Table 3, Example 2.2.2) containing bioactive core, two second components, and inert substances. Some examples of the final concentration of elements in end-application-solution by applying different dilution factors are shown in Table 12.

Another example is the biopesticide composition PW-1.5 (Table 3, Example 2.2.3) containing bioactive core, two active elements (one of them derived from a fermentation process), and inert substances. Some examples of the final concentration of elements in end-application-solution by applying different dilution factors are shown in Table 13.

TABLE 12

Example of composition dilutions ADI-23 (bioactive core + 2 second components + inert substances)

| | | Bioactive core | | | Second component | | | | |
|---|---|---|---|---|---|---|---|---|---|
| Dose (ml/L) | Dilution factor | Hydroalcoholic root/rhizome extract of *Z. officinale* (%) | Essential oil *C. cassia* (%) *encapsulated | Lecithin (CAS 8002-43-5%) | Essential oil *Cymbopogon citratus* leaf (CAS 8007-02-1) | *P. americana* extract (%) | Organosilicone adjuvant (CAS 67674-67-3, %) | Polymeric adjuvant (Atlas ™ G5002L) | Polysorbate 80 |
| 1 | X1000 | 0.007 | 0.01 | 0.01 | 0.01 | 0.013 | 0.012 | 0.002 | 0.007 |
| 2 | X500 | 0.014 | 0.02 | 0.02 | 0.02 | 0.027 | 0.024 | 0.005 | 0.015 |
| 4 | X250 | 0.028 | 0.04 | 0.04 | 0.04 | 0.054 | 0.048 | 0.01 | 0.030 |
| 6 | X166 | 0.042 | 0.06 | 0.06 | 0.06 | 0.081 | 0.072 | 0.015 | 0.045 |
| 8 | X125 | 0.056 | 0.08 | 0.08 | 0.08 | 0.108 | 0.096 | 0.02 | 0.060 |
| 10 | X100 | 0.07 | 0.10 | 0.10 | 0.10 | 0.135 | 0.12 | 0.025 | 0.075 |

*Mixture of encapsulating agent (β-cyclodextrin) and *C. cassia* essential oil

TABLE 13

Example of composition dilutions PW-1.5 (bioactive core + 2 second components + inert substances)

| | | Bioactive core | | | Second component | | | |
|---|---|---|---|---|---|---|---|---|
| Dose (ml/L) | Dilution factor | Hydroalcoholic root/rhizome extract of *Z. officinale* (%) | Essential oil *C. verum* leaf (CAS 8015-91-6, %) | Lecithin (CAS 8002-43-5%) | Product obtained from *Aspergillus niger* fermentation(%)* | *P. americana* extract (%) | Organosilicone adjuvant (CAS 67674-67-3, %) | Polymeric adjuvant (Atlas ™ G5002L) |
| 1 | X1000 | 0.003 | 0.01 | 0.017 | 0.044 | 0.007 | 0.012 | 0.013 |
| 2 | X500 | 0.006 | 0.02 | 0.035 | 0.089 | 0.014 | 0.024 | 0.027 |
| 4 | X250 | 0.012 | 0.04 | 0.070 | 0.178 | 0.028 | 0.048 | 0.054 |

TABLE 13-continued

| Example of composition dilutions PW-1.5 (bioactive core + 2 second components + inert substances) | | | | | | | |
|---|---|---|---|---|---|---|---|
| | Bioactive core | | | Second component | | | |
| | Hydroalcoholic | | | | | | |
| Dose (ml/L) | Dilution factor | root/rhizome extract of Z. officinale (%) | Essential oil C. verum leaf (CAS 8015-91-6, %) | Lecithin (CAS 8002-43-5%) | Product obtained from Aspergillus niger fermentation(%)* | P. americana extract (%) | Organosilicone adjuvant (CAS 67674-67-3, %) | Polymeric adjuvant (Atlas ™ G5002L) |
| 6 | X166 | 0.018 | 0.06 | 0.105 | 0.267 | 0.042 | 0.072 | 0.081 |
| 8 | X125 | 0.024 | 0.08 | 0.140 | 0.356 | 0.056 | 0.096 | 0.108 |
| 10 | X100 | 0.03 | 0.10 | 0.175 | 0.445 | 0.07 | 0.12 | 0.135 |

*Product obtained regard to example 3

Another example is the biopesticide composition MxM5 (Table 3, Example 2.2.3) containing bioactive core, two second components (pure compounds) and inert substances. Some examples of the final concentration of elements in end-application-solution by applying different dilution factors are shown in Table 14.

TABLE 14

| Example of composition dilutions MxM5 (bioactive core + 2 second components + inert substances) | | | | | | | |
|---|---|---|---|---|---|---|---|
| | Bioactive core | | | | | | |
| | Hydroalcoholic root/rhizome | Essential oil C. verum | Lecithin | Second component | | | Polymeric |
| Dose (ml/L) | Dilution factor | extract of Z. officinale (%) | leaf (CAS 8015-91-6, %) | (CAS 8002-43-5%) | Citral (%) | Benzyl benzoate (%) | Organosilicone adjuvant (CAS 67674-67-3, %) | adjuvant (Atlas ™ G5002L) |
| 1 | X1000 | 0.001 | 0.0005 | 0.017 | 0.012 | 0.02 | 0.013 | 0.01 |
| 2 | X500 | 0.002 | 0.001 | 0.035 | 0.025 | 0.04 | 0.026 | 0.02 |
| 4 | X250 | 0.004 | 0.002 | 0.070 | 0.05 | 0.08 | 0.052 | 0.04 |
| 6 | X166 | 0.006 | 0.003 | 0.105 | 0.075 | 0.12 | 0.078 | 0.06 |
| 8 | X125 | 0.008 | 0.004 | 0.140 | 0.1 | 0.16 | 0.104 | 0.08 |
| 10 | X100 | 0.010 | 0.005 | 0.175 | 0.125 | 0.20 | 0.13 | 0.10 |

Example 6. General Laboratory Assay Protocols

6.1. Target Fly Species

The pest species that were utilized as biological targets for most efficacy and mechanism of action assays are detailed in Table 15.

TABLE 15

| Biological targets employed within the invention framework | | | |
|---|---|---|---|
| Order | Genus | Specie | Trophic adaptation |
| Hemiptera | Bemisia | tabaci (Gennadius) | Polyphagous sucking |
| Hemiptera | Trialeurodes | vaporariorum (Westwood) | Polyphagous sucking |

Targets were selected taking into account the economic importance of their incidence on horticultural crops, the development of resistance to synthetic insecticides, their ability to transmit viruses, as well as their widespread employment as study models for management of related pests belonging to the whitefly group.

6.2. Breeding and Maintenance of the Biologic Targets

To establish populations, different adult populations of each species were sampled (Table 15). The populations are representative of different greenhouses in the province of Almeria, where there is one of the highest concentrations of crops under plastic. The representative pool of each of the targets was established on one of their host plants (Phaseolus vulgaris L). The established population was maintained in walk-in climate chambers under the following environmental conditions: 22° C.±1° C., 60-70% relative humidity, and 16:8-hour photoperiod (light: dark).

6.3. Reference Products

Different bioassays described below included different recommended products for whitefly control and currently commercialized on the market (Table 16). They are intended to be employed as positive efficacy controls for the biopesticidal compositions claimed in this invention.

TABLE 16

| Commercialized products as positive control utilized in efficacy assays | | | |
|---|---|---|---|
| Trademark (EP) | Active ingredient | Manufacturer | Classification |
| Actara ® | Kiametoxan | Syngenta | Chemical insecticide |
| Confidor ® | Imidacloprid | Bayer | Chemical insecticide |
| Oberon ® | Ketoenols | Bayer | Chemical insecticide |
| Requiem ® | Chenopodium sp. | Bayer | Natural insecticide |
| Venerate ™ XC | Burkholderia sp. | Marrone Bio | Natural insecticide |
| Plenum ® | Pimetrozina | Syngenta | Chemical insecticide |
| Prev-AM Plus ® | Citrus oil | Oro Agri USA | Natural insecticide |

6.4. Microassays (In Vitro and In Vivo) for Control of Whitefly

Test protocols were developed in order to discriminate between the different modes and mechanisms of action of the tested substances. The bioactive core (*Zingiber officinale*+cinnamaldehyde source+soy lecithin) as well as the different biopesticide compositions of this invention were tested in efficacy trials against selected pests. For them, in vitro assays in petri dishes and in vivo assays were performed using reproducible in-plant models.

General description of the types of assays of use of the compositions employed within the framework of this invention.

Assays are divided into three large groups:

Mortality from contact: insecticidal ability of a product against whitefly in the short term and medium term (0-24 h) by topical application. Here we discriminate between two mechanisms of action:

Effect on fly cuticle and membranes (osmotic shock).

Effect on fly respiratory organs (choking).

Effect on fly behavior: the effect on the control of whitefly in the medium and long term (24 h-7 days) by interacting with taste and smell receptors.

True repellents: The fly moves away from the treated area without coming into direct contact with the substance (olfactory receptors).

Landing inhibitors: The fly moves away from the treated area after coming into direct contact with the substance (taste and olfactory receptors).

Antifeedants or deterrents:

Inhibition of feeding: The fly comes in contact with the product but does not feed and ends up moving away from the treated area (taste receptors).

Inhibition of oviposition: The fly contacts the treated area, but laid eggs are inhibited (olfactory and taste receptors).

The methodologies employed for each of the proposed trials are described below.

Mortality from contact

The objective of the test is to evaluate the effect of different doses of the substance to be tested on whitefly adult mortality by topical application.

Figure 5:
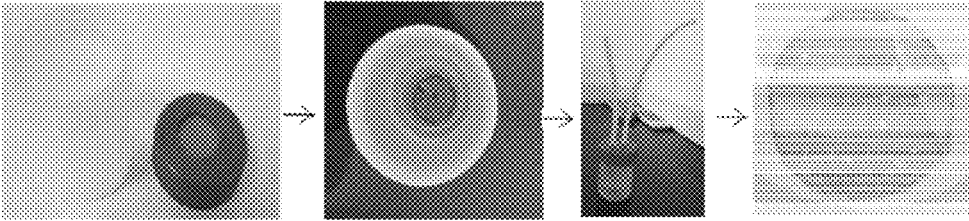
FIG. 5: Design of an in vitro mortality from contact assay.

The test is performed on plastic screw-cap canisters of 10 cm height and 5 cm diameter. In the center of the lid, a 2 cm$^2$ orifice is perforated and covered with a fine fabric of pore length 0.77×0.27 mm (longitudinal: transverse). A leaf disk (5.7 cm$^2$) is cut from the host plant (*Phaseolus vulgaris*) and placed (beam side down) on the bottom of the jar previously coated with a 1 cm thick layer of agar (12% w/v) which in addition to support provides the necessary moisture to the disk during the time of the trial (24 hours). 15 adult individuals previously captured with a pooter were introduced into each jar (FIG. 5). The jar with flies is incubated for one minute at 4° C. in order to momentarily decrease the mobility of the pest and facilitate its settling on the disk at the base of the jar. Subsequently, the substance to be treated (bioactive core, biopesticide composition, reference products) is sprayed evenly onto flies settled at the bottom of the jar using a portable diffuser. Once the product is applied, the jar is kept in a climatic chamber under the same conditions as described for raising the fly. Each adult mortality trial consists of 20 jars (replicates) for each of the treatments and 20 jars (replicates) for the control (water). At the same time, each of the assays is replicated 3 times for the assay.

The different combinations of bioactive core (Table 3) are assayed at an initial concentration between 0.01-0.5% of end-application-solution. The biopesticide compositions (Table 3) and reference products are applied in the range of recommended doses (between 1-5 mL of formulated/Liter of water). At the end of the trial (24-hour), the number of dead and live flies is counted using a magnifier stereoscopic. In case of determination of the knock-down effect, the counting is done serially at 2, 4, 6, 8, 16 and 24 hours after the treatment is applied. The fly is considered dead when it shows no sign of mobility when touched by an entomological brush. Mortality is expressed in % relative to control and data were corrected using Abbott's formula:

$$\% \; Mcorregida = \frac{X - Y}{100 - Y} \times 100$$

Where,

X=Percent (%) mortality on treatment and

Y=Percent (%) mortality on control

Data were compared using Analysis of Variance (ANOVA, p<0.05) and LSD post hoc test to verify the differences between means. For this purpose, the statistical package IBM® SPSS Statistics® was used. In case of non-normality of the data, the Wilconxon multiple-rank nonparametric test will be applied (p<0.05). Treatments with significant percent mortality (>70%) are selected for dose-response studies. The dose at which the 50% of the desired effect occurs (EC$_{50}$) is calculated by probit regression analysis based on the Log-dose.

Figure 6:
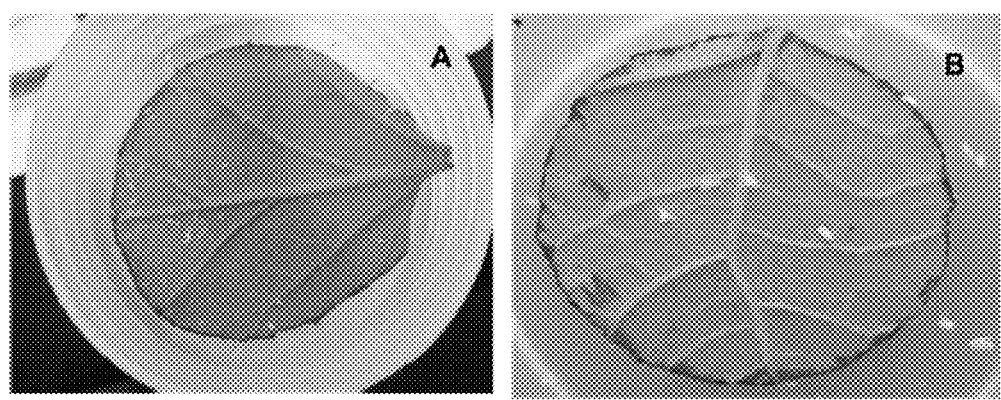
FIG. 6: Microscope observation of whitefly adults in mortality from contact assays. A: Destructuring of membranes, B: Blocked tracheal spiracles (asphyxiation).

Dead flies are closely observed under microscope in order to differentiate the mechanism by which mortality occurs (FIG. 6). Within the framework of this invention the mechanisms differed as follows:

Dead fly retaining its intact shape and structure with a slight yellowish color: Asphyxiation is proposed as the primary mechanism of action.

Dead fly that has lost its shape and structure (disintegrated and/or crushed) with a brown color: osmotic shock due to membrane/cuticle decay is proposed as the primary mechanism of action.

Subsequent execution examples explain the biopesticidal compositions, concentrations, organisms, and more specific details employed for each particular experiment.

Effects on Fly Behavior: Direct Repellency

Olfactometer methodology was employed for direct repellency studies.

Figure 7:
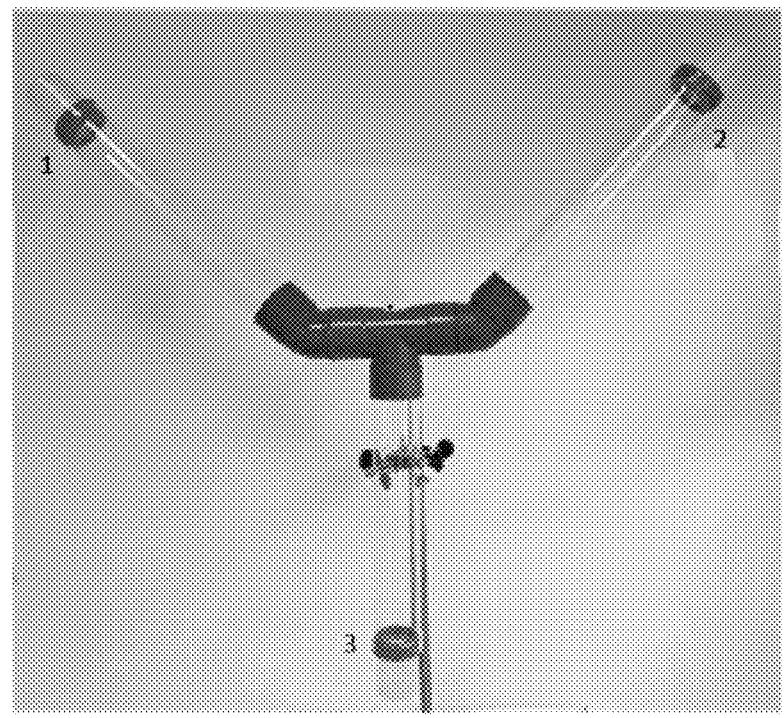
FIG. 7: Y-olfactometer designed for spatial repellency assays.

Studies referenced herein employ a Y-tube olfactometer as shown in FIG. 7. Two plastic screw cap jars of 10 cm tall and 5 cm diameter were prepared. In the center of the lid, a 2 cm$^2$ orifice is perforated and covered with a fine fabric of pore length 0.77×0.27 mm (longitudinal: transverse). A leaf disk (5.7 cm$^2$) is cut from the host plant (*Phaseolus vulgaris*) and placed (beam side down) on the bottom of the jar previously coated with a 1 cm thick layer of agar (12% in water w/v) which in addition to support provides the necessary moisture to the disk during the duration of the trial (24 hours).

One of the jars treated with the substance to be tested (biopesticide composition) (2) was placed in one of the upper arms and the other an identical jar with a water treated disc (control) (1). By the lower arm the flies are released (3). The experiment is incubated in walk-in climate chambers under the following environmental conditions: 22° C.±1° C., 60-70% relative humidity and 16:8-hour photoperiod (light: dark). In each trial, 3 olfactometers were employed and considered as replicates. After 24 h, flies settle for treatment and control are counted, and the repellency index (% RI) is calculated for each substance tested using the following formula:

$$\% \ RI = \left[ 1 - \left( \frac{T}{C} \right) \right] \times 100$$

Where,

T: Number of live flies within the treated chamber (settled on treated disk and/or in jar walls)

C: Number of live flies within the control chamber (settled on the control disk and/or on the jar walls)

Means of the % RI were analyzed by the Wilconxon signed-rank-test multi-rank nonparametric test (p<0.05), using IBM® SPSS Statistics® statistical package.

Subsequent execution examples explain the biopesticidal compositions, concentrations, organisms and more specific details employed for each particular experiment.

Effects on Fly Behavior: Antifeeding Effects (Indirect Repellency)

Within the framework of this invention, we have considered anti-food any substance that acts on fly behavior inhibiting its feeding, settling and oviposition. Settling inhibition is considered an indirect repelling effect.

Settling Inhibition Bioassays on Planta (Choice).

This type of assay determines the effect of the tested substances on settling of whitefly adults in host plants (*Phaseolus vulgaris*). It is based on adult preference for treated (2) and control (1) host plants placed in the same box. Rectangular methacrylate entomological boxes 50×35 cm (height×width) with lid on top were designed for bioassay development. A vent hole 25 cm in diameter covered with a mesh of pore length 0.77×0.27 mm (longitudinal: transverse) is made in the cap. Two identical pots were prepared each with host plant at fully developed 2-leaf stage (rest of the side and apical leaves removed). One of the plants is treated with the solution to be tested (bioactive core, biopesticide composition) (2) and the other with water (control) (1), with a portable diffuser, ensuring good coverage of the product on both faces of the leaf. Both plants (treated (2) and control (1)) are placed in the same entomological box (3). A jar with 100 adult whitefly individuals is then placed at an equidistant point between the two plants, at the bottom of the box. The experimental design can be observed in FIG. 8.

Subsequently, the box is capped and incubated in a climatic chamber under the same conditions as described above. Each repellency assay consists of 5 boxes (replicates) for each of the screening variants. At the end of the trial (24 hours), the number of living individuals settled on the treated and control plant is counted. In addition, the number of dead individuals on both surfaces in the same manner as in the mortality trials is counted. Using these data, calculate the settling inhibition rate (% SI) according to the following formula:

$$\% \ SI = \left[ 1 - \left( \frac{\% \ T}{\% \ C} \right) \right] \times 100$$

Where,

T: Flies settled on treated plants

C: Flies settled on control plants

Data were analyzed by the Wilconxon non-parametric multiple-rank test (p<0.05), using the statistical package IBM® SPSS Statistics® Treatments with percent settling inhibition (>60%) were selected for dose-response studies. The dose at which the 50% of the desired effect occurs (EC$_{50}$) was calculated by regression analysis (Log-dose probit).

Subsequent execution examples explain the biopesticidal compositions, concentrations, organisms, and more specific details employed for each particular experiment.

Oviposition Inhibition Bioassays

This assay determines the effect of the different substances on laid eggs of adults of the treated (2) and control (1) pest in host plants (*Phaseolus vulgaris*) placed in the same box (assays of choice).

Figure 8:
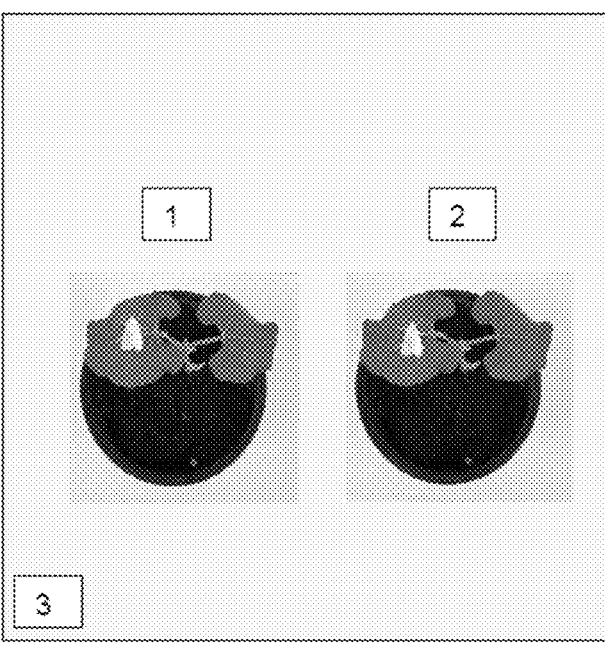
FIG. 8: Experimental design in planta feeding inhibition assays.

The experiment was carried out in entomological boxes of methacrylate and proceeded in the same way as in the settling inhibition bioassays on plant (FIG. 8).

At the end of the experiment, the settled adults on leaflet are removed and the eggs counted in a magnifier stereoscopic. Using the obtained data, Oviposition Inhibition Index (% 10) is calculated according to the following formula:

$$\% \ IO = \left[ 1 - \left( \frac{T}{C} \right) \right] \times 100$$

Where,

T=number of eggs deposited on treatment and

C=number of eggs deposited in control.

The data were analyzed using Wilconxon's multiple-rank nonparametric test (p<0.05), using IBM® SPSS Statistics® statistical package. Treatments with percent settling inhibition (>60%) were selected for dose-response studies. The dose at which the 50% of the desired effect occurs (EC$_{50}$) was calculated by regression analysis based on Log-dose probit.

Subsequent execution examples explain the biopesticidal compositions, concentrations, organisms and more specific details employed for each particular experiment.

Example 7. General Protocol for Field Trial

Field trial protocols (open field) and semi-field (greenhouse) for the evaluation of whitefly control activity of biopesticide compositions herein are designed according to THE EPO/EPPO guidelines (i EPP/EPPO Bulletin, 2012, 42 (3), 367-381). The experimental design in each of the trials is explained in detail in the subsequent execution examples.

Example 9: Demonstration of Synergistic Effect of Bioactive Core

One of the main advantages of this invention is the synergistic effect in the control of flies belonging to the group of whiteflies (mortality, repellency and inhibition of oviposition) achieved by combining the active elements making up bioactive core. Strictly speaking, synergy is mathematically defined as the interaction between two or more components in a mixture such that:

A greater effect is obtained at the same dose in the mixture than resulting from the sum of the effects of the individual components (potentiation synergy).

An effect equal is obtained at the same rate as found in the mixture that resulting from addition of the effects of the individual components (synergy of addition)

However, this definition is very difficult to apply in a strict sense in the following cases:

Mixture of plant extracts, due to the different effects derived from their complex chemical composition, often not quantified.

Compositions having different mechanisms of action. Synergistic effects must be studied against a known mechanism of action assuming linearity in response.

However, different applications of synergistic combinations exist in the phytomedicine field (Phytomedicine, Vol. 8 (5), pp. 401-409. 2001) and in pesticidal compositions (Neth. J. PlantPath. 70, 1964; US005837652A, ES 2.153.503 T3). The synergistic effect achieved in the mixture with respect to the individual components manifests itself in two ways:

Significant increase in activity for each of the individual mechanisms of action: mortality-repellency oviposition.

Significant decrease in the effective doses of efficacy ($EC_{50}$) of the elements in the mixture compared to the doses in which they are used individually.

Figure 10:
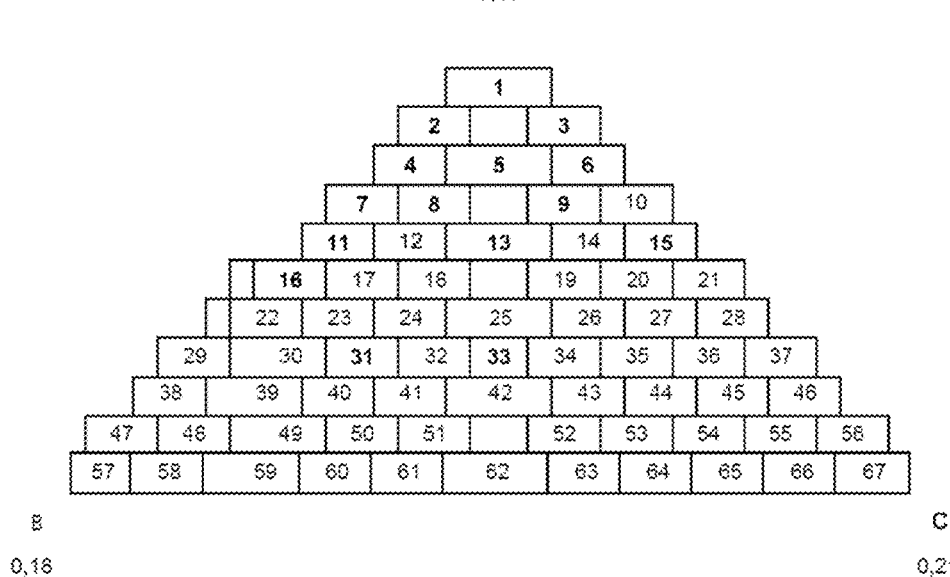
FIG. 10: Gibbs Triangle Methodology for the Study of synergistic, boosting, and cooperative mixtures. The upper triangle shows the number of synergistic combinations generated between components A, B and C. The lower triangle represents the proportion of each of the ingredient A, B and C in the combination.
Figure 10:
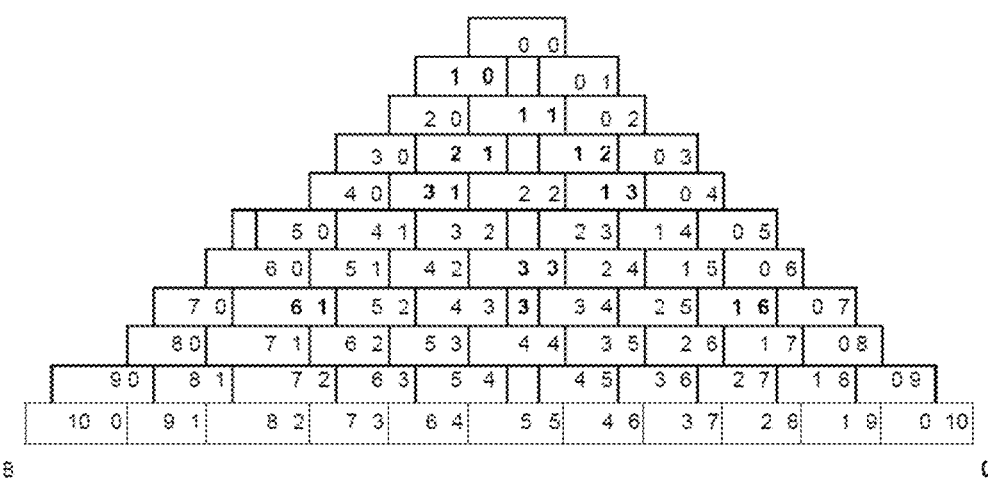

Different combinations between the elements making up bioactive core and soy lecithin were designed to study potentiating and/or cooperative effects. Sub-lethal concentrations of the different components were chosen for the design of the combinations. Gibbs Triangle methodology (Triangle Screen Formulation Approach) was employed as shown in FIG. 10.

In this example, synergistic combinations between components A (Hydroalcoholic extract of roots *Zingiber officinale*), B (Essential oil from *C. verum* leaves) and C (Soy lecithin) are studied starting with their sub-lethal concentrations of mortality from contact against whitefly according to Table 17. The upper triangle shows the different combinations, and the lower triangle shows the different ratios of each combination.

Exemplary and non-limiting, whitefly efficacy of one of the combinations of the bioactive core with soy lecithin employed in biopesticide compositions, is shown in Table 17. Combination "33" corresponds to combination A+B+C at a ratio of 300/3 (see Gibbs Triangle) which corresponds to the following concentrations in end-application-solution: A:0.02%, B:0.06%, C: 0.07%.

TABLE 17

| Sub-lethal concentrations and cooperative effect of bioactive core and soy lecithin | | |
|---|---|---|
| Treatment | Dose (% p/v) | % M |
| Hydroalcoholic extract of | 0.5 | 66.6 ± 6.2 |
| Z. officinale (A) | 0.06 | 35.7 ± 5.7 |
| Source of cinnamaldehyde | 0.5 | 25.9 ± 3.4 |
| (B) | 0.18 | 11.7 ± 3.4 |
| Soy lecithin (C) | 1 | 71.1 ± 5.4* |
| | 0.21 | 40.2 ± 8.2 |
| [(A) + (B)] + (C) [3:3:3] | 0.15% | 84.3 ± 2.7* |

% M: Percentage of mortality calculated according to example 6.4;
(% SI) Settling inhibition was calculated according to Example 6.4;
(% IO) Oviposition inhibition was calculated according to Example 6.4.
(A); Hydroalcoholic extract of roots/rhizomes *Zingiber officinale*;
(B); Essential oil from *C. verum* leaves;
(C) Soy lecithin;
*$p < 0.05$, Wilconxon non-parametric multiple-rank test.

Example 10. Controlled Release of Cinnamaldehyde Source

Repellent activity in many cases is due to the presence of volatile compounds that interact with fly chemoreceptors.

Due to their volatile nature, these compounds have very short-term efficacy lost after hours. In addition, their low water solubility and their tendency to oxidation with light make their formulation complex. Cyclodextrin complexation (encapsulation) is one of the most widely used technologies for the protection and controlled release of these types of substances.

Many of the biopesticidal compositions disclosed herein have at least one encapsulated component to ensure controlled release of the active ingredient. In this invention encapsulation has been carried out using the co-precipitation method for its encapsulation efficiency (>60%) and its ease of scale-up.

β-cyclodextrin (W7) was preferably selected as a matrix using the results obtained (Table 18). The process was performed as detailed in Example 4. Eighty percent encapsulation was obtained. The efficacy of encapsulation from the chemical standpoint was followed by Gas Chromatography-Mass Spectrometry (GC-MS) analysis. Chromatographic tracking (GC-MS) of the process is shown in FIG. 9. The encapsulation process favors the retention of some bioactive components from the extract and their controlled release.

In Table 18, the activity of the free and encapsulated *C. verum* essential oil (taken as an example of cinnamaldehyde source) on the behavior (repellency and inhibition of oviposition) of whitefly (*Bemisia tabaci*) is shown. Encapsulation with β-cyclodextrin (W7) according to the methodology proposed in Example 4 exhibited the best results in efficacy and controlled release.

TABLE 18

| Example of repellent activity of free and encapsulated *C. verum* essential oil (0.04%) | | | | |
|---|---|---|---|---|
| | Settling inhibition (% SI) | | Oviposition Inhibition (% IO) | |
| Variant | 12 hours | 24 hours | 12 hours | 24 hours |
| EA without encapsule | 45.5 ± 4.2 | 64.0 ± 4.1 | 52.3 ± 1.6 | 62.30 ± 3.2 |
| EA + β-cyclo-dextrin (W7) | 49.4 ± 6.5 | 78.1 ± 0.6* | 81.6 ± 2.1* | 93.2 ± 0.9* |
| EA + Colloidal silica | 51.4 ± 6.1 | 66.7 ± 4.7 | 61.3 ± 5.4 | 82.9 ± 3.2* |

*$p < 0.05$, Wilconxon non-parametric multiple-rank test;
β-cyclodextrin and Colloidal silica are encapsulating agent;
(% SI) and (% IO) were calculated according to the methodology proposed in Example 6.4

Example 13. Validation of Biopesticidal Compositions Versus Whitefly

Table 19 shows the activity against whitefly of all biopesticide compositions (Table 3) and reference products used as positive controls for comparative purposes. All biopesticide compositions exhibit high efficacy in controlling whitefly, which is statistically significant when compared to the control. The compositions show similar and/or superior efficacies to the reference products (chemical and natural) currently existing on the market for control of whitefly.

TABLE 19

| Biopesticide compositions/ reference products | Dose | Activity against *Bemisia tabaci* | | |
|---|---|---|---|---|
| | | % M | % SI | % IO |
| Biopesticide compositions (Table 3) | | | | |
| M1 | 4 ml/liter water | 77.4 ± 11.0 (b) | 69.3 ± 4.6* | 70.4 ± 5.7* |
| M4 | 4 ml/liter water | 80.2 ± 7.1 (ab) | 79.4 ± 7.2* | 81.4 ± 4.3* |
| WF_F4 | 4 ml/liter water | 98.7 ± 1.3 (a) | 93.9 ± 3.1* | 94.5 ± 5.2* |
| ADI-23 | 4 ml/liter water | 94.9 ± 1.8 (a) | 87.9 ± 2.1* | 95.7 ± 8.1* |
| PW-1.5 | 4 ml/liter water | 82.8 ± 6.5 (ab) | 71.2 ± 5.1* | 70.4 ± 6.1* |
| MxM14 | 4 ml/liter water | 91.4 ± 4.9 (a) | 82.1 ± 5.4* | 83.2 ± 4.9* |
| MxM15 | 4 ml/liter water | 82.3 ± 6.8 (ab) | 65.2 ± 7.6* | 74.0 ± 3.3* |
| MxM22 | 4 ml/liter water | 95.4 ± 3.12 (a) | 80.2 ± 9.1* | 83.3 ± 13.2* |
| MxM5 | 4 ml/liter water | 85.8 ± 14.1 (ab) | 74.4 ± 6.8* | 79.3 ± 3.3* |
| MxM19 | 4 ml/liter water | 98.6 ± 1.4 (a) | 80.2 ± 7.1* | 82.3 ± 5.5* |
| MxM12 | 4 ml/liter water | 88.2 ± 6.2 (ab) | 77.4 ± 2.2* | 75.4 ± 4.2* |
| MxM16 | 4 ml/liter water | 74.1 ± 3.9 (b) | 69.5 ± 3.8* | 70.8 ± 5.5* |
| MxM25 | 4 ml/liter water | 74.3 ± 6.5 (b) | 77.2 ± 6.3* | 80.6 ± 9.9* |
| Reference products (Table22, Example 6.3) | | | | |
| Actara ® | 40 g/hl | 26.5 ± 2.7 (e) | 88.9 ± 4.1* | 87.6 ± 2.8* |
| Confidor ® | 75 cc/hl | 71.5 ± 2.6 (b) | 45.4 ± 8.2* | 78.8 ± 9.7* |
| Oberon ® | 0.06% | 54.7 ± 4.5 (d) | 38.0 ± 2.1* | 0.0 ± 0.0 |
| Requiem ® | 5 cc/L | 73.6 ± 4.1 (b) | 81.8 ± 5.2* | 96.4 ± 1.8* |
| Venerate ™XC | 20 cc/L | 50.9 ± 5.1 (d) | — | — |
| Plenum ® | 40 g/hl | 39.1 ± 5.2 (e) | — | — |
| Prev-AM Plus ® | 2 l/ha | 50.9 ± 5.1 (d) | 71.1 ± 13.1* | 76.7 ± 8.2* |

% M: Percentage of mortality calculated according to example 6.4%
SI: Settling inhibition was calculated according to Example 6.4.;
% IO Oviposition inhibition was calculated according to Example 6.4.
Means of the same letter inside the same column indicate significant differences (ANOVA, $\rho < 0,05$);
*$p < 0.05$, Wilcoxon paired test;
Biopesticide composition as detailed in Table 3.

Example 15. Effect of WF_F4 Composition on Whitefly Population Dynamics in Greenhouse Assay

15.1 Background

The study was conducted to evaluate the greenhouse efficacy of the composition WF_F4 (7.5% hydroalcoholic extract of *Z. officinale* roots, 16% essential oil from *C. verum* leaves and 17,5% soy lecithin) against whitefly in eggplant (*Solanum melongena*). The effect on reduction in adult numbers and egg number was used as efficacy variables. The experimental design employed was randomized blocks with 7 treatments and 3 replicates per treatment.

The trial was carried out in Roquetas de Mar (Almeria, Spain) during 2019. Almeria has the highest concentration of greenhouses worldwide and is one of the main horticultural suppliers in Europe. Eggplant crop accounts for around 5% of the greenhouse area in Almeria. Whiteflies (*Bemicia tabaci* and *Trialeurodes vaporariorum*) are considered to be the primary pests that attack this crop.

For all the foregoing, the area selected for testing is considered as representative for conducting such an efficacy trial.

15.2. Objectives

To evaluate the efficacy of the WF_F4 composition in reducing whitefly adults (*B. tabaci*) on eggplant.

To evaluate the efficacy of the WF_F4 composition in reducing whitefly eggs (*B. tabaci*) on eggplant.

Comparing the efficacy of the composition WF_F4 to chemical and naturally-occurring reference products.

To evaluate the phytotoxicity of the WF_F4 composition on the main crop and its effect on beneficial (non-target) insects.

15.3. Reference Products

Three commercial reference products used for whitefly control were used as positive controls (Table 20). Requiem® is a natural formulation registered in the United States and other countries.

TABLE 20

| Reference products used as positive controls | | |
|---|---|---|
| Trademark | Active ingredient | Manufacturer |
| Confidor ® | Imidacloprid | Bayer |
| Requiem ® | *Chenopodium* sp | Bayer |
| STARCH-GEL ® | Starch syrup | Kyoyu Agri. It |

15.4. Treatments

The employed treatments and doses are detailed in Table 21

TABLE 21

| Treatments and doses employed | | | |
|---|---|---|---|
| Treatment number | Name of treatment | Dose | Unit |
| 1 | UTC (Non-treated Control) | — | — |
| 2 | WF_F4 (2 cc/l) | 2 | cc/liter water |
| 3 | WF_F4 (4 cc/l) | 4 | cc/liter water |
| 4 | WF_F4 (6 cc/l) | 6 | cc/liter water |
| 5 | CONFIDOR ® | 2 | cc/liter water |
| 6 | REQUIEM ® | 5 | cc/liter water |
| 7 | STARCH-GEL ® | 10 | cc/liter water |

39 40

15.5. Assay Overview

About the crop

Species: *Solanum melongena* (Eggplant)

Distance Between Plants (m): 0.75

Row Distance (m): 3

Planting density: 10000 plants/ha

Irrigation system: Drop

About the Plot

Country: Spain

Locality: Roquettes de Mar (Almeria)

Zip Code: 04740

Coordinates (N/W): 36,442272-2,515594

Plot width (m): 3

Plot Length (m): 4

Size of experimental plot: 12 m²

Replicates: 3

Treatments: 7

Number of plots: 21

Area of field trial: 300 m 2

15.6. Experimental Design

Figure 11:
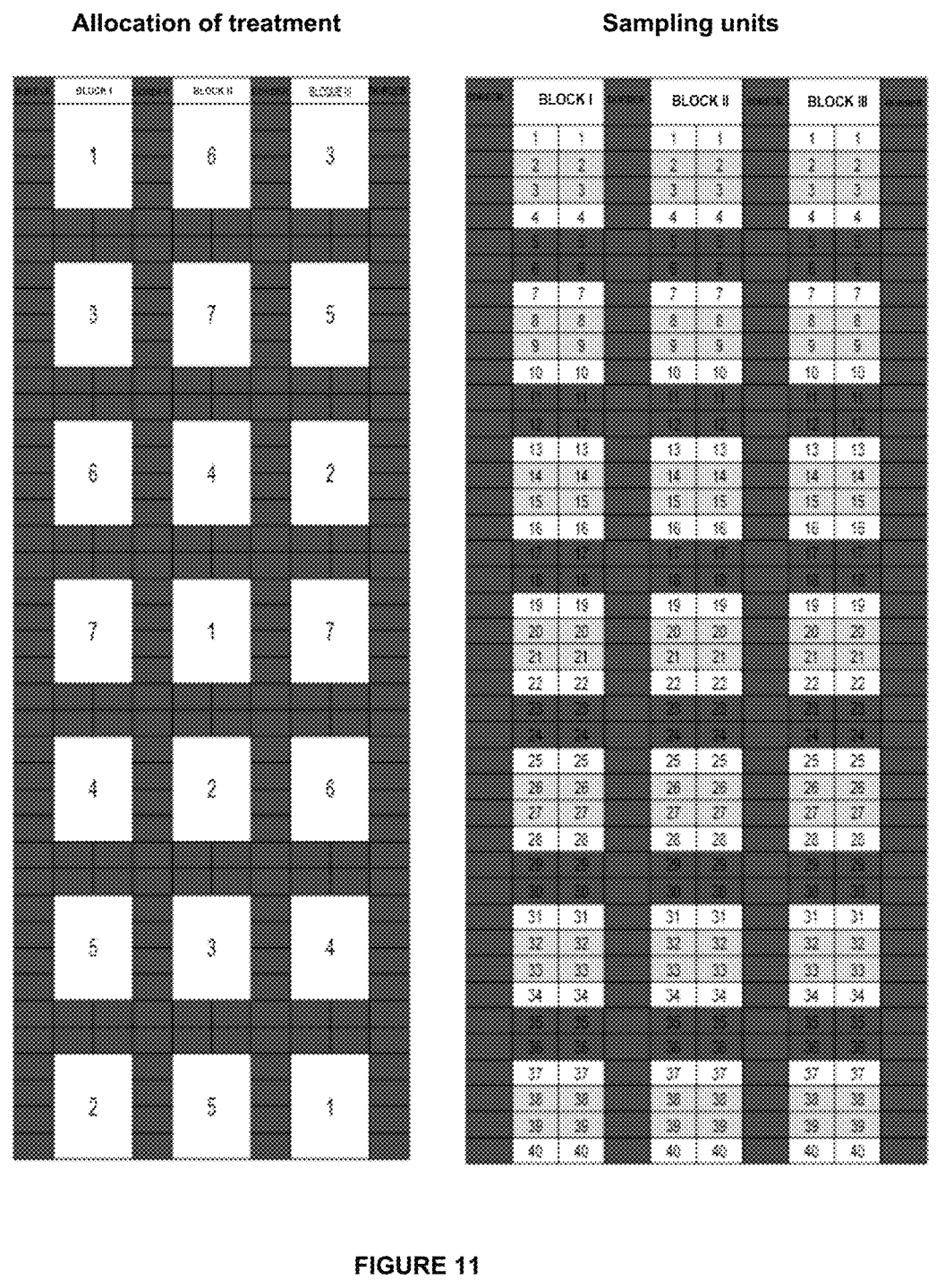

A randomized block experimental design was employed. A graphical representation of the design and spatial distribution of experimental plots is shown in FIG. 11.

15.7. Application Scheme

Table 22 details the application characteristics. A single application was made.

TABLE 22

Characteristics of equipment and application scheme

| Application | A |
|---|---|
| Date | Jun. 8, 2019 |
| Equipment | MATABI |
| Volume of end-application-solution | 800 l/ha |
| Pression | 600 KPA |
| Temperature (° C.) | 28 |
| Relative Humidity (%) | 65 |
| Plant height | 1 |
| Plant width | 0.5 |

15.8 Efficiency Variables and Data Capture

Efficacy variables and sampling times are shown in Table 23.

TABLE 23

Efficacy variables and data capture times

| Variables | Time |
|---|---|
| Number of whitefly adults per leaf | DAA-0, DAA-1, DAA-3, DAA-6 |
| Number of whitefly eggs per leaf | DAA-0, DAA-6 |

Data capture dates were as follows:

1. DAA-0: 06/08/19 (application time)

2. DAA-1: 07/08/19 (One day after application)

3. DAA-3: 09/08/19 (Three days after application)

4. DAB-6: 12/08/19 (Six days after application)

At each sampling 4 plants were randomly selected, and 3 leaves were sampled from each plant. The number of adults was determined by counting live flies on both surfaces (beam and underside) of the selected leaf. For eggs, from each leaf sampled, 2 cm² discs were taken and eggs counted with the aid of a stereo magnifier.

15.9. Effects on Growing

In addition to the efficacy variables, the following data were taken:

Percent area damaged by phytotoxicity (if any).

Visual effect (in-house diagnosis) on beneficial (non-target) insects.

15.10. Data Processing and Statistical Analysis

The data (number of adults and number of eggs per leaf) were expressed as means of 12 independent measurements in each treatment and replicate. Observed data (means) were expressed relative to the control using Henderson-Tilton formula set forth below:

$$Eficacia\ (\%) = \left(1 - \left(\frac{Ta}{Ca}\right) \times \left(\frac{Cb}{Tb}\right)\right) \times 100$$

where,

Ta=Number of adults/eggs on treatment after application

Tb=Number of adults/eggs on treatment prior to application

Ca=Number of adults/eggs in control after application

Cb=Number of adults/eggs in control before application.

Corrected efficacy values were compared using one-way Analysis of Variance (ANOVA) ($p<0.05$). For comparison of means, the least significant differences (LSD) post-hoc test was employed. IBM® SPSS Statistics® was used for the analysis.

15.11. Results and Discussion

Corrected efficacy of the WF_F4 composition and reference products on the number of whitefly adults and eggs, respectively, is shown in Tables 24 and 25.

TABLE 24

Efficacy of the WF_F4 composition and reference products on the number of whitefly adults
Number of whitefly adults per leaf (Corrected efficacy, %)[1]

| | | Day after application (DDA) | | |
|---|---|---|---|---|
| No | Treatments | DAA-1 | DAA-3 | DAA-6 |
| 1 | UTC | — | — | — |
| 2 | WF_F4 (2 cc/L) | 80.00 (bc) | 72.66 (c) | 44.14 (ab) |
| 3 | WF_F4 (4 cc/L) | 83.86 (bc) | 76.24 (c) | 58.68 (b) |
| 4 | WF_F4 (6 cc/L) | 87.59 (c) | 67.75 (bc) | 56.00 (b) |
| 5 | CONFIDOR ® | 42.16 (a) | 35.50 (a) | 13.23 (a) |
| 6 | REQUIEM ® | 51.97 (ab) | 30.43 (a) | 44.96 (ab) |
| 7 | STARCH-GEL ® | 43.50 (a) | 45.64 (a) | 28.60 (ab) |

[1]Data is expressed in means and corrected by Henderson-Tilton Formulate.
Means of the same letter inside the same column indicate significant differences (ANOVA-LSD, ρ < 0.05)

TABLE 25

Efficacy of the WF_F4 composition and reference products on the number of whitefly eggs
Number of whitefly eggs per leaf (Corrected efficacy, %)[1]

| | | Day after application (DDA) DAA-6 |
|---|---|---|
| No | Treatments | |
| 1 | UTC | — |
| 2 | WF_F4 (2 cc/L) | 76.77 (cd) |
| 3 | WF_F4 (4 cc/L) | 75.81 (cd) |
| 4 | WF_F4 (6 cc/L) | 78.22 (d) |
| 5 | CONFIDOR ® | 53.90 (b) |

TABLE 25-continued

Efficacy of the WF_F4 composition and reference
products on the number of whitefly eggs
Number of whitefly eggs per leaf (Corrected efficacy, %)[1]

| No | Treatments | Day after application (DDA) DAA-6 |
|---|---|---|
| 6 | REQUIEM ® | 60.41 (bc) |
| 7 | STARCH-GEL ® | 28.82 (a) |

[1]Data is expressed in means and corrected by Henderson-Tilton Formulate.
Means of the same letter inside the same column indicate significant differences (ANOVA-LSD, $\rho < 0.05$)

The data obtained shows clear product efficacy in controlling whitefly. Composition WF_F4 shows very significant levels of reduction in the number of whitefly adults and eggs up to 6 days after application. The results obtained with the composition WF_F4 were clearly superior to the efficiencies of both chemical and natural reference products.

No symptoms of phytotoxicity were detected on the crop treated with the composition WF_F4 and reference products at any of the doses tested. Moreover, no beneficial effects on wildlife were observed throughout the experiment.

The invention claime is:

1. A biopesticide composition consisting essentially of a synergistic bioactive core, consisting essentially of:
   a) an essential oil, an oleoresin, an aqueous extract, an alcoholic extract or a hydroalcoholic extract of the root or rhizome of *Zingiber officinale* Roscoe;
   b) cinnamaldehyde or an essential oil or oleoresin of *Cinnamomum* sp.; and
   c) soy lecithin in solid or liquid form, wherein the soy lecithin consists essentially of hydrolyzed lecithin or partially hydrolyzed lecithin.

2. The biopesticide composition of claim 1, wherein the essential oil, the oleoresin, the aqueous, the alcoholic or the hydroalcoholic root or rhizome extract from *Zingiber officinale* Roscoe is present at 0.1%-99.8%, the cinnamaldehyde or the essential oil or the oleoresin of *Cinnamomum* sp. is present at 0.1%-99.8%, and the soy lecithin is a solid or a liquid hydrolyzed soy lecithin or a partially hydrolyzed lecithin present at 0.1%-99.8%.

3. The biopesticide composition of claim 1, wherein the essential oil or oleoresin of *Cinnamomum* sp. consists essentially of cinnamaldehyde.

4. The biopesticide composition of claim 3, wherein the cinnamaldehyde or the essential oil or oleoresin of *Cinnamomum* sp. is in a free form.

5. The biopesticide composition of claim 1, wherein the biopesticide further consists essentially of a second component selected from the group consisting of geranial-citral A-, neral-citral B-, saponins, benzyl alcohol, benzyl benzoate, benzyl acetate, eugenol, 1,8-cineole, thymol, geraniol, geranyl acetate, short-chain fatty acids, long-chain saturated fatty acids, and unsaturated fatty acids.

6. The biopesticide composition of claim 1, further consisting essentially of a component selected from the group consisting of *Angelica* sp, *Annona* sp, *Artemisia* sp., *Carum* sp., *Chenopodium* sp., *Citrus* sp., *Coffea* sp., *Crocus* sp., *Cyamopsis* sp., *Cymbopogon* sp., *Cytisus* sp., *Eurycoma* sp., *Ficus* sp., *Fumaria* sp., *Geranium* sp., *Ginkgo* sp., *Helianthus* sp., *Hyssopus* sp., *Jatropha* sp., *Lavandula* sp., *Mentha* sp., *Moringa* sp., *Nigella* sp., *Ocimum* sp., *Olea* sp., *Papaver* sp., *Pelargononium* sp., *Persea* sp., *Petroselinum* sp., *Pimpinella* sp., *Prunus* sp., *Quassia* sp., *Retama* sp., *Rheum* sp., *Rosmarinus* sp. *Salvia* sp., *Satureja* sp., *Schoenocaulon* sp., *Trigonella* sp., *Thymus* sp. and *Vitis* sp.

7. The biopesticide composition of claim 5, wherein the second component is obtained from a plant selected from the group consisting of *Cymbopogon* sp., *Litsea* sp., *Aloysia* sp., *Ocimun* sp., Melissa sp., *Citrus* Sp., *Cinnamomum* sp., *Syzygium* sp., *Curcuma* sp., *Zingiber* sp., *Ocimum* sp., *Cyamopsis* sp., *Quillaja* sp., *Trigonella* sp., *Saponaria* sp., *Crocus* sp., *Yucca* sp., Beta sp., *Hedera* sp., *Polygala* sp., *Primula* sp,, Jasminum sp., *Eucalyptus* sp., *Salvia* sp., *Thymus* sp., *Curcuma* sp, *Rosmarinus* sp, *Artemisia* sp., *Rosa* sp., *Geranium* sp., *Pelargonium* sp., *Persea* sp., *Glycine* sp., *Helanthus* sp., and *Olea* sp.

8. The biopesticide composition of claim 7, wherein the second component is in a free or an encapsulated form.

9. The biopesticide composition of claim 1, further consisting essentially of organosiloxanes.

10. The biopesticide composition of claim 1, further consisting essentially of carboxymethylcellulose, sodium carboxymethylcellulose, and microcrystalline cellulose.

11. The biopesticide composition of claim 1, further consisting essentially of a component selected from the group consisting of maltodextrins, cyclodextrins, lecithins, vegetable oils, silica gel, colloidal silica and silicon dioxides.

12. A solution consisting essentially of the biopesticide composition of claim 1, wherein the essential oil, the oleoresin, the aqueous, the alcoholic or the hydroalcoholic root or rhizome extract from *Zingiber officinale* Roscoe is present at 0.1%-99.8%, the cinnamaldehyde or the essential oil or the oleoresin of *Cinnamomum* sp. is present at 0.1%-99.8%, and the soy lecithin is a solid or a liquid hydrolyzed soy lecithin or a partially hydrolyzed lecithin present at 0.1%-99.8%.

* * * * *